US012393616B2

(12) United States Patent
Kim et al.

(10) Patent No.: US 12,393,616 B2
(45) Date of Patent: Aug. 19, 2025

(54) RECOMMENDER FOR RESPONSIVE VISUALIZATION TRANSFORMATIONS

(71) Applicant: ADOBE INC., San Jose, CA (US)

(72) Inventors: Hyeok Kim, Evanston, IL (US); Jane Elizabeth Hoffswell, Seattle, WA (US); Ryan A. Rossi, San Jose, CA (US); Fan Du, Milpitas, CA (US); Eunyee Koh, San Jose, CA (US); Shunan Guo, San Jose, CA (US)

(73) Assignee: Adobe Inc., San Jose, CA (US)

( * ) Notice: Subject to any disclaimer, the term of this patent is extended or adjusted under 35 U.S.C. 154(b) by 254 days.

(21) Appl. No.: 17/678,346

(22) Filed: Feb. 23, 2022

(65) Prior Publication Data

US 2023/0267137 A1    Aug. 24, 2023

(51) Int. Cl.
*G06F 16/332* (2025.01)
*G06F 8/33* (2018.01)
(Continued)

(52) U.S. Cl.
CPC ............ *G06F 16/3322* (2019.01); *G06F 8/33* (2013.01); *G06F 16/532* (2019.01); *G06F 16/538* (2019.01); *G06F 40/103* (2020.01)

(58) Field of Classification Search
None
See application file for complete search history.

(56) References Cited

U.S. PATENT DOCUMENTS 7,685,377 B1    3/2010  Milligan
8,621,422 B1 *  12/2013 Hsu .......................... G06F 8/34
                                                            717/104

(Continued)

FOREIGN PATENT DOCUMENTS

AU     2012372150 A1    11/2013
CN       113011400 A     6/2021
(Continued)

OTHER PUBLICATIONS

A Declarative Language for Integrating Machine Learning in Visual Analytics by Jianping et. al(https://arxiv.org/pdf/2009.01399.pdf) (Year: 2020).*

(Continued)

*Primary Examiner* — Mandrita Brahmachari
(74) *Attorney, Agent, or Firm* — Shook, Hardy & Bacon L.L.P.

(57) ABSTRACT

Embodiments of the present invention provide systems, methods, and computer storage media for generating and recommending responsive visualizations. In an example embodiment, a design specification of a source visualization and an author's preferences are used to identify and rank compatible sets of candidate responsive transformations (e.g., using answer set programming). Each set is evaluated and ranked according to one or more cost metrics that quantify changes in information density, messaging, or popularity. Some embodiments generate a transformation specification in a declarative grammar that represent the sets of candidate responsive transformations independent of the structure of the source visualization specifications, compile each declarative transformation specification into a rendering grammar specification, and generate a responsive visualization by compiling the rendering grammar specification using a rendering grammar compiler. In some embodiments, the highest ranked responsive visualizations are presented as authoring recommendations and/or the highest ranked responsive visualization is automatically selected and applied.

18 Claims, 15 Drawing Sheets

(51) Int. Cl.
    *G06F 16/532* (2019.01)
    *G06F 16/538* (2019.01)
    *G06F 40/103* (2020.01)

(56) References Cited

U.S. PATENT DOCUMENTS

| | | | |
|---|---|---|---|
| 9,866,392 | B1 | 1/2018 | Campagna et al. |
| 10,013,497 | B1 | 7/2018 | Boodman |
| 10,620,790 | B2 | 4/2020 | Ellis et al. |
| 10,664,362 | B2 | 5/2020 | Larson et al. |
| 10,970,053 | B2* | 4/2021 | Kandogan ............... G06F 8/38 |
| 11,182,748 | B1 | 11/2021 | Neckermann et al. |
| 11,256,710 | B2* | 2/2022 | Gulwani ............. G06F 16/258 |
| 11,500,882 | B2* | 11/2022 | Anand ............ G06F 16/24578 |
| 11,714,807 | B2 | 8/2023 | Amulu et al. |
| 11,720,550 | B2 | 8/2023 | Budovski et al. |
| 11,782,576 | B2 | 10/2023 | Harris et al. |
| 11,816,436 | B2 | 11/2023 | Panuganty et al. |
| 2002/0052910 | A1 | 5/2002 | Bennett et al. |
| 2003/0033554 | A1 | 2/2003 | Bomfim et al. |
| 2003/0133505 | A1 | 7/2003 | Koyanagi |
| 2008/0154905 | A1 | 6/2008 | Paalasmaa et al. |
| 2008/0320225 | A1 | 12/2008 | Panzer et al. |
| 2009/0322755 | A1* | 12/2009 | Holm-Peterson ..... G06F 40/197 345/440 |
| 2012/0272240 | A1 | 10/2012 | Starks et al. |
| 2013/0263019 | A1 | 10/2013 | Castellanos et al. |
| 2013/0329557 | A1 | 12/2013 | Petry et al. |
| 2013/0332862 | A1* | 12/2013 | Mirra .................... G06F 3/048 705/36 R |
| 2014/0282184 | A1 | 9/2014 | Dewan et al. |
| 2014/0306964 | A1* | 10/2014 | Reddish ................ G06F 8/433 345/440 |
| 2014/0310619 | A1* | 10/2014 | Fickenwirth ........... G06F 9/451 715/762 |
| 2016/0110167 | A1* | 4/2016 | Broadbent .......... G06F 11/3604 717/117 |
| 2016/0232151 | A1* | 8/2016 | Blackmon ........... G06F 16/9577 |
| 2017/0090910 | A1 | 3/2017 | Deluca et al. |
| 2018/0113873 | A1* | 4/2018 | Gulwani ................ G06F 40/16 |
| 2018/0129372 | A1 | 5/2018 | Ellis et al. |
| 2018/0189294 | A1* | 7/2018 | Anand .................. G06F 16/338 |
| 2018/0189691 | A1 | 7/2018 | Oehrle et al. |
| 2019/0042212 | A1* | 2/2019 | Kandogan ................ G06F 8/38 |
| 2019/0102703 | A1 | 4/2019 | Belyaev et al. |
| 2019/0138912 | A1 | 5/2019 | Modarresi et al. |
| 2019/0361720 | A1 | 11/2019 | Balachandran |
| 2020/0034481 | A1 | 1/2020 | Asplund et al. |
| 2020/0058012 | A1 | 2/2020 | Chandorkar et al. |
| 2020/0065772 | A1 | 2/2020 | Whitehead et al. |
| 2020/0134074 | A1 | 4/2020 | Mankovskii et al. |
| 2020/0151217 | A1 | 5/2020 | Kothe et al. |
| 2020/0293933 | A1 | 9/2020 | Ghosh et al. |
| 2020/0334607 | A1 | 10/2020 | Fadel et al. |
| 2020/0349589 | A1 | 11/2020 | Southall et al. |
| 2020/0387810 | A1 | 12/2020 | Hodgson et al. |
| 2021/0097062 | A1 | 4/2021 | Mishra et al. |
| 2021/0240702 | A1 | 8/2021 | Mei et al. |
| 2021/0272029 | A1* | 9/2021 | Gustafsson .......... G06Q 10/063 |
| 2021/0350068 | A1 | 11/2021 | Sanossian |
| 2021/0374770 | A1 | 12/2021 | Banerjee et al. |
| 2022/0300836 | A1 | 9/2022 | Rossi et al. |
| 2022/0358405 | A1 | 11/2022 | Every et al. |
| 2022/0405314 | A1 | 12/2022 | Du et al. |
| 2023/0048938 | A1 | 2/2023 | Vertsel et al. |
| 2023/0063424 | A1 | 3/2023 | Zeghlache |
| 2023/0079109 | A1* | 3/2023 | Anand ............ G06F 16/24578 |
| 2023/0133505 | A1 | 5/2023 | Nakaya et al. |
| 2023/0169671 | A1 | 6/2023 | Jung et al. |
| 2023/0385141 | A1 | 11/2023 | Xu et al. |
| 2024/0333615 | A1 | 10/2024 | Ford et al. |
| 2025/0061506 | A1 | 2/2025 | Sankararaman et al. |

FOREIGN PATENT DOCUMENTS

| | | |
|---|---|---|
| CN | 115438210 A | 12/2022 |
| WO | 03/62993 A2 | 7/2003 |
| WO | 2021/231040 A1 | 11/2021 |

OTHER PUBLICATIONS

"ai2html", archietse, Retrieved from Internet URL : http://ai2html.org/, accessed on May 16, 2022, pp. 1-13 (2011).

"Cascade and Inheritance", MDN, Retrieved from Internet URL : https://developer.mozilla.org/en-US/docs/Learn/CSS/Building_blocks/Cascade_and_inheritance, accessed on Jul. 4, 2022, pp. 1-26.

"DataWrapper", Retrieved from Internet URL : https://www.datawrapper.de/, accessed on May 12, 2022, pp. 9.

"Documentation-Vega", Retrieved from Internet URL : https://vega.github.io/vega/docs/, accessed on May 13, 2022, pp. 2.

"Power BI", Microsoft, Retrieved from Internet URL : https://powerplatform.microsoft.com/en-us/, accessed on Jul. 5, 2022, pp. 9.

"Tableau Software", Retrieved from Internet URL : https://www.tableau.com/, accessed on Jul. 5, 2022, pp. 13 (2003).

"Using Google Charts", Google Developers, Retrieved from Internet URL: https://developers-dot-devsite-v2-prod.appspot.com/chart/interactive/docs, accessed on May 13, 2022, pp. 2 (2019).

"Using Media Queries", MDN, Retrieved from Internet URL : https://developer.mozilla.org/en-US/docs/Web/CSS/Media_Queries/Using_media_queries, accessed on Jul. 4, 2022, pp. 1-8.

"ZingSoft", ZingChart, Retrieved from Internet URL :https://www.zingchart.com/, accessed on Jun. 29, 2022, p. 1.

Andrews, K., "Responsive Visualisation", In MobileVis '18 Workshop at CHI, ACM, pp. 1-6 (Apr. 2018).

Bentley, E., "The Web as Medium for Data Visualization", In The Data Journalism Handbook: Towards a Critical Data Practice, pp. 182-192 (2021).

Bostock, M., "d3-format", Retrieved from Internet URL : https://web.archive.org/web/20220421224649/https://github.com/d3/d3-format/, accessed on May 12, 2022, pp. 1-11.

Bostock, M., et al., "$D^3$ Data-Driven Documents", IEEE Transactions on Visualization and Computer Graphics, vol. 17, No. 12, pp. 2301-2309 (Dec. 2011).

Brewka, G., et al., "Answer Set Programming at a Glance", Retrieved from Internet URL : https://doi.org/10.1145/2043174.2043195, ACM, vol. 54, No. 12, pp. 93-103 (Dec. 2011).

Bryant, J., and Jones, M., "Responsive Web Design", CHAPTER 4, pp. 37-49 (2012).

Cui, Z., et al., "DataSite: Proactive visual data exploration with computation of insight-based recommendations", Information Visualization, Retrieved from Internet URL : https://doi.org/10.1177/1473871618806555, vol. 18, No. 2, pp. 251-267 (2019).

Gebser, M., et al., "Clingo = ASP + Control: Preliminary Report", Retrieved from Internet URL : https://doi.org/10.48550/arXiv.1405.3694, pp. 1-9 (May 2014).

Gebser, M., et al., "Potassco: The Potsdam Answer Set Solving Collection", AI Communications, IOS Press, https://doi.org/10.3233/AIC-2011-0491, pp. 107-124 (2011).

Giacomo, E., D., et al., "Network Visualization Retargeting", 6th International Conference on Information, Intelligence, Systems and Applications (IISA), IEEE, pp. 1-6 (2015).

Hoffswell, J., et al., "SetCoLa: High-Level Constraints for Graph Layout", Eurographics Conference on Visualization (EuroVis), vol. 37, No. 3, pp. 1-12 (2018).

Hoffswell, J., et al., "Techniques for Flexible Responsive Visualization Design", CHI, ACM, pp. 1-13 (2020).

Jakobsen, M., R., and Hornbæk, K., "Interactive Visualizations on Large and Small Displays: The Interrelation of Display Size, Information Space, and Scale", IEEE Transactions on Visualization and Computer Graphics, vol. 19, No. 12, pp. 2336-2345 (Dec. 2013).

Kim, H., et al., "An Automated Approach to Reasoning About Task-Oriented Insights in Responsive Visualization", IEEE Transactions on Visualization and Computer Graphics, pp. 1-11 (Jul. 2021).

(56) References Cited

OTHER PUBLICATIONS

Kim, H., et al., "Design Patterns and Trade-Offs in Responsive Visualization for Communication", Eurographics Conference on Visualization, vol. 40, No. 3, pp. 1-12 (Apr. 2021).

Kim, Y., and Heer, J., "Gemini: A Grammar and Recommender System for Animated Transitions in Statistical Graphics", IEEE, arXiv:2009.01429v1, pp. 1-10 (Sep. 2020).

Kim, Y., et al., "GraphScape: A Model for Automated Reasoning about Visualization Similarity and Sequencing", CHI, ACM, pp. 2628-2638 (May 2017).

Leclaire, J., and Tabard, A., "R3S.js—Towards Responsive Visualizations", In Workshop on Data Exploration for Interactive Surfaces DEXIS, ACM ITS, pp. 16-19 (2015).

Lin, H., et al., "Dziban: Balancing Agency & Automation in Visualization Design via Anchored Recommendations", CHI, ACM, pp. 1-12 (2020).

Ma, R., et al., "LADV: Deep Learning Assisted Authoring of Dashboard Visualizations from Images and Sketches", IEEE Transactions on Visualization and Computer Graphics, pp. 1-15 (2020).

Mackinlay, J., D., et al., "Show Me: Automatic Presentation for Visual Analysis", IEEE Transactions on Visualization and Computer Graphics, pp. 1-8 (2007).

Mendez, G., G., et al., "Bottom-up vs. Top-down: Trade-offs in Efficiency, Understanding, Freedom and Creativity with InfoVis Tools", CHI, ACM, pp. 1-12 (2017).

Mohorovicic, S., "Implementing Responsive Web Design for Enhanced Web Presence", 36th International Convention on Information and Communication Technology, Electronics and Microelectronics (MIPRO), pp. 1206-1210 (2013).

Moritz, D., "Formalizing Visualization Design Knowledge as Constraints: Actionable and Extensible Models in Draco", IEEE Trans. Visualization & Comp. Graphics, pp. 1-11 (2018).

Muth, L., C., "Create better, more responsive text annotations (yes, also on maps)", Retrieved from Internet URL : https://blog.datawrapper.de/better-more-responsive-annotationsin-datawrapper-data-visualizations/, accessed on May 14, 2022, pp. 1-10.

Muth, L., C., and Aisch, G., "Our new Tables: responsive, with sparklines, bar charts and sticky rows", Retrieved from Internet URL : https://blog.datawrapper.de/new-tabletool-barcharts-fixed-rows-responsive-2/, accessed on May 14, 2022, pp. 1-14.

Gal, R., "Responsive visualizations coming to Power BI", Retrived from Internet URL : https://powerbi.microsoft.com/en-us/blog/responsive-visualizations-coming-to-power-bi/, accessed on May 13, 2022, pp. 1-11.

Sam, C., "Ai2html and Its Impact on the News Graphics Industry", In MobileVis '18 Workshop at CHI, pp. 1-6 (2018).

Satyanarayan, A., and Heer, J., "Lyra: An Interactive Visualization Design Environment", Eurographics Conference on Visualization , vol. 33, No. 3, pp. 1-10 (2014).

Satyanarayan, A., et al., "Reactive Vega: A Streaming Dataflow Architecture for Declarative Interactive Visualization", In IEEE Trans. Visualization & Comp. Graphics, pp. 1-10 (2015).

Satyanarayan, A., et al., "Vega-Lite: A Grammar of Interactive Graphics", IEEE Trans. Visualization & Comp. Graphics, pp. 1-10 (2016).

Srinivasan, A., et al., "Augmenting Visualizations with Interactive Data Facts to Facilitate Interpretation and Communication", IEEE Transactions on Visualization and Computer Graphics, vol. 25, No. 1, pp. 672-681 (Jan. 2019).

Wickham, H., et al., "A Layered Grammar of Graphics", Journal of Computational and Graphical Statistics, vol. 19, No. 1, pp. 3-28 (2010).

Wongsuphasawat, K., et al., "Voyager 2: Augmenting Visual Analysis with Partial View Specifications", Proceedings of the 2017 CHI Conference on Human Factors in Computing Systems, ACM, pp. 2648-2659 (2017).

Wongsuphasawat, K., et al., "Voyager: Exploratory Analysis via Faceted Browsing of Visualization Recommendations", IEEE Transactions on Visualization and Computer Graphics, pp. 1-10 (2015).

Wu, A., et al., "Learning to Automate Chart Layout Configurations Using Crowdsourced Paired Comparison", Association for Computing Machinery, ACM, ISBN, pp. 1-12 (2021).

Wu, A., et al., "MobileVisFixer: Tailoring Web Visualizations for Mobile Phones Leveraging an Explainable Reinforcement Learning Framework", IEEE Transactions on Visualization and Computer Graphics, pp. 1-11 (Aug. 2020).

Wu, Y., et al., "ViSizer: A Visualization Resizing Framework", IEEE Transactions on Visualization and Computer Graphics, pp. 1-14 (2012).

Xiong, C., et al., "Visual Arrangements of Bar Charts Influence Comparisons in Viewer Takeaways", IEEE Trans. Visualization & Comp. Graphics, pp. 1-11 (Aug. 2021).

"CRM Analytics", Salesforce Analytics Software and Tools I Tableau CRM—Salesforce.com, Retrieved from Internet URL : https://www.salesforce.com/products/crm-analytics/overview/, accessed on Dec. 7, 2022, pp. 14.

"Lexio—Data stories speak louder than dashboards", Lexio | The Future of Data + Analytics, Narrative Science, A Salesforce Company, Retrieved from Internet URL : Wayback Machine—https://web.archive.org/web/20220520130304/https://narrativescience.com/lexio, accessed on Dec. 7, 2022, pp. 11 (2021).

"Natural Language Technology for Every Use Case—Arria NLG", Arria NLG Technology Suite, Retrieved from Internet URL : https://www.arria.com/technology-suite/, accessed on Dec. 7, 2022, pp. 1.

"Visa Chart Components", Visa Developer Center, Retrieved from Internet URL : https://developer.visa.com/pages/chart-components, accessed on Dec. 7, 2022, pp. 9.

"Wordsmith I Automated Insights", Retrieved from Internet URL : https://automatedinsights.com/wordsmith/, accessed on Dec. 7, 2022, pp. 4.

Ahmad et al., "ScaleViz: Scaling Visualization Recommendation Models on Large Data", In Pacific-Asia Conference on Knowledge Discovery and Data Mining, Apr. 25, 2024, pp. 93-104.

Ding et al., "QuickInsights: Quick and Automatic Discovery of Insights from Multi-Dimensional Data", SIGMOD'19, Jun. 30-Jul. 5, 2019, 15 pages.

International Search Report and Written Opinion received for PCT Patent Application No. PCT/US2022/027539, mailed on Jul. 28, 2022, 12 pages.

Kachuee et al., "Opportunistic Learning: Budgeted Cost-Sensitive Learning From Data Streams", Published as a conference paper at ICLR 2019, Available at : <arXiv:1901.00243v2 [cs. LG] Feb. 18, 2019>, Feb. 18, 2019, pp. 1-12.

Kim, D. H, et al., "Towards Understanding How Readers Integrate Charts and Captions: A Case Study with Line Charts", In Proceedings of the CHI Conference on Human Factors in Computing Systems, pp. 1-11 (May 8-13, 2021).

Law, P-M., et al., "Characterizing Automated Data Insights", In IEEE Visualization Conference (VIS), arXiv:2008.13060v2, pp. 1-5 (Sep. 4, 2020).

Li et al., "Feature Selection: A Data Perspective", ACM Comput. Surv. vol. 50, No. 6, Article 94, Dec. 2017, 45 pages.

Notice of Allowance received for U.S. Appl. No. 18/484,674, mailed on Aug. 23, 2024, 14 pages.

Qian et al., "Learning to Recommend Visualizations from Data", KDD '21, Aug. 14-18, 2021, 11 pages.

Shi, D., et al., "Calliope: Automatic visual data story generation from a spreadsheet", IEEE Transactions on Visualization and Computer Graphics, arXiv:2010.09975v1, vol. 27, No. 2, pp. 1-11 (Oct. 20, 2020).

U.S. Appl. No. 18/409,240, Title : Training and Utilizing Language Machine Learning Models to Create Structured Outputs for Building Digital Visualizations From Analytics Databases and Digital Text Prompts, filed Jan. 10, 2024.

Non-Final Office Action received for U.S. Appl. No. 18/668,888, mailed on Mar. 13, 2025, 17 pages.

\* cited by examiner

```
410
 1 { ...
 2   encoding: {
 3     x: {
 4       field: "category",
 5       media_rule: {
 6         channel: y
 7   }},
 8     y: {
 9       field: "amount",
10       media_rule: {
11         channel: x
12   }},
13   axis: {
14     labelFormat: "$,d"
15     media_rule: {
16       labelFormat: ",d"
17   }},
18   size: { ...
19   legend: {
20     labelFormat: "$,d"
21     media_rule: {
22       labelFormat: ",d"
23   }}} ...}
```

```
420
 1 { specifier: {
 2     role: "encoding",
 3     channel: ["x", "y"] },
 4   action: "swap: }

1 { specifier: {
 2     role: "text",
 3     format: "$,d" },
 4   action: "modify",
 5   option: {
 6     format: ",d" }}
```

*FIG. 4.*

```
Transformation specification 510
1  { name: "exampleSpec",
2    config: {
3      condition: "small",
4      aspectRatio: "portrait" },
5    transformations: [
6      { specifier: { role: "mark" },
7        action: "modify",
8        option: {
9          color: { value: "red" }}},
     ... // more rules
78  ]}
```

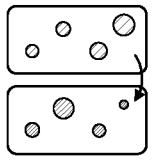

a rule describing "modify the color of the marks to red"

FIG. 5A.

Role expressions 520

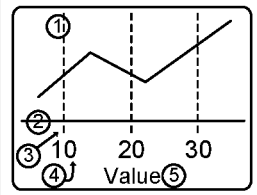 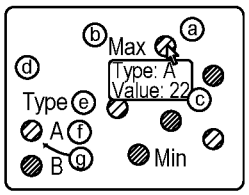 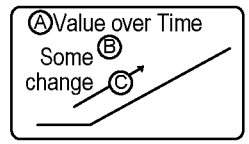

| | |
|---|---|
| data | data sets |
| (data.)transform | transformations on raw data (e.g., filtering) |
| view | view/layout |
| (view.)row | the row elements of a view |
| (view.)column | the column elements of a view |
| (view.)facet | the facets of a multiple-view chart |
| (view.)axis | the axes of a view |
| (view.)hAxis | the horizontal axes of a view |
| (view.)vAxis | the vertical axes of a view |
| [axis].grid① | the grid lines of axes |
| [axis].domain② | the domain lines of axes |
| [axis].tick③ | the tick lines of axes |
| [axis].label④ | the labels of axes |
| [axis].title⑤ | the titles of axes |

[axis] = (view.)axis/hAxis/vAxis

| | |
|---|---|
| (view.)layer | the layers of a view |
| (view.)layer.transform | transformations on data for layers |
| (view.layer.)mark ⓐ | the marks of layerse |
| (view.layer.)mark.label ⓑ | the text labels attached to marks |
| (view.layer.mark.)tooltip ⓒ | the tooltips attached to marks |
| (view.layer.)legend ⓓ | the legends of layers |
| (view.layer.)legend.title ⓔ | the titles of legends |
| (view.layer.)legend.label ⓕ | the labels of legends |
| (view.layer.)legend.mark ⓖ | the marks of legends |
| (view.)title Ⓐ | the title of a view |
| (view.)annotation Ⓑ | the non-data text annotations |
| (view.)emphasis Ⓒ | the non-data informational marks |

FIG. 5B.

```
Transformation rule object 530
1  { comment: "modify axis labels' color to blue
     and axis domains' color to red",
2    specifier: { role: "axis" },
3    action: "modify",
4    option: {
5      label: { color: { value: "blue" },
6      domain: { color: { value: "red"}}}}
7
8  { comment: "modify mark labels' color to blue",
9    specifier: { role: "mark" },      a rule describing "modify
10   action: "modify",                  the color of the marks to red"
11   option: {
12     role: "label",
13     color: { value: "blue" }}}
14 { comment: "externalize annotations",
15   specifier: {
16     role: "annotation" },
17   action: "reposition",
18   option: { external: ture }}
19
20 { comment: "transpose axes",
21   specifier: { role: "view" },
22   action: "transpose" }}
23
24 { comment: "transpose axes (equivalent)",
25   specifier: { role: "layer" },
26   action: "swap",
27   option: {
28     channel: ["x", "y"]}}
29
30 { comment: "serialize label-marks",
31   specifier: { role: "mark.label" },
32   action: "transpose",
33   option: { serial: true }}
34
35 { comment: "add values of 50 and 60 to axis",
36   specifier: { role: "axis" },
37   action: "add",
38   option: { values: [50, 60] }}
39
40 { comment: "duplicate an arrow mark (non-data)",
41   specifier: {
42     role: "emphasis",
43     id: "arrow" },
44   action: "duplicate",
45   option: { x: 50, y: 15 }}      (10. 5)              (50. 15)
46
47 { comment: "remove marks with a color channel",
48   specifier: {
49     role: "mark",
50     channel: "color" },
51   action: "remove" }
52
53 { comment: "remove the color channel of marks",
54   specifier: {
55     role: "mark" },
56   action: "remove",
57   option: {
58     channel: "color" }}
59
```

*FIG. 5C.*

```
Transformation rule object (cont.) 530
60 { comment: "convert color channel to size channel",
61   specifier: {
62     role: "mark" },
63   action: "replace",
64   option: {
65     channel: { from: "color" , to: "size"}}}
66
67 { comment: "replace axis label with color legend",
68   specifier: {
69     role: "axis.label", field: "plan" },
70   action: "replace",
71   option: {
72     to: {
73       role: "legend",
74       channel: "color" }}}
76
77 { comment: "exchange color and size channels",
78   specifier: { role: "mark" },
79   action: "swap",
80   option: {
81     channel: ["color", "size"]}}}
```

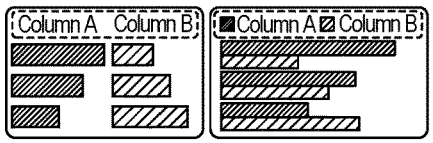
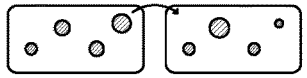

*FIG. 5C. (cont.)*

```
620
1 { specifier: {
2     role: "mark" }
3   action: "modify",
4   option: {
5     color: {
6       value: "gray"}}}
```

```
610
1 { specifier: {
2     role: "mark",
3     datum: {
4       cat: "Apparel: },
5   action: "modify",
6   option: {
7     color: {
8       value: "red"}}}
```

*FIG. 6.*

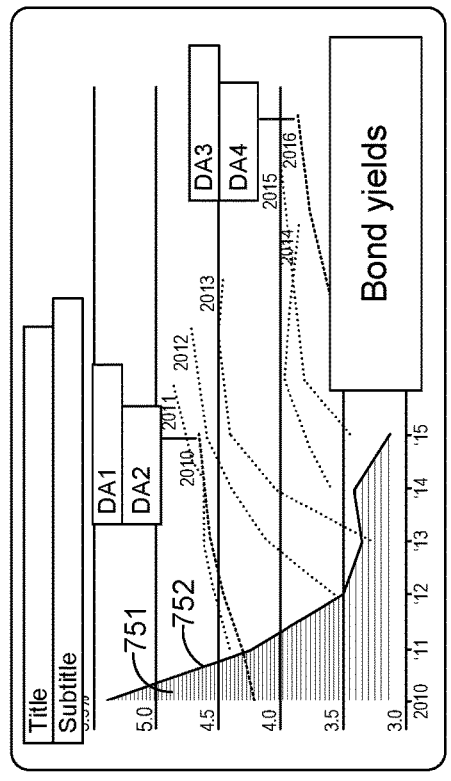
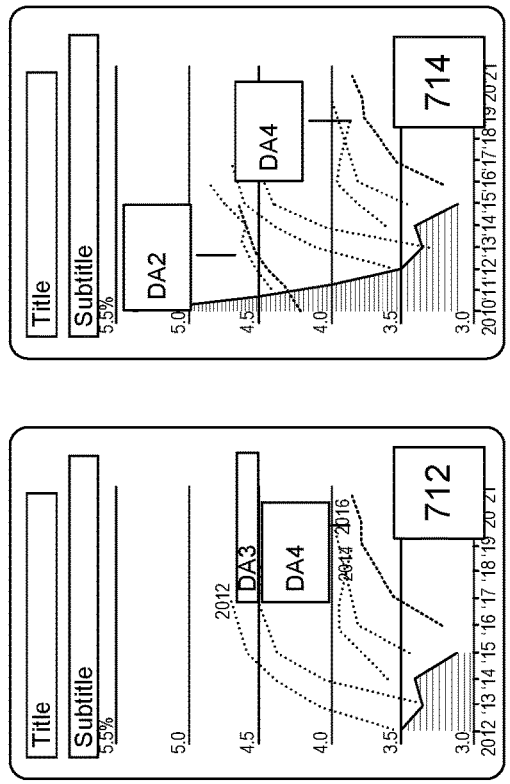
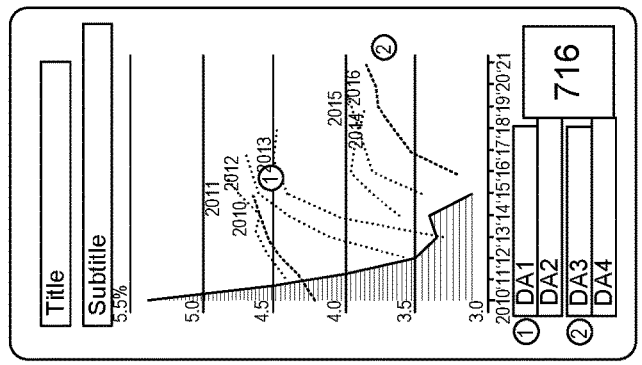
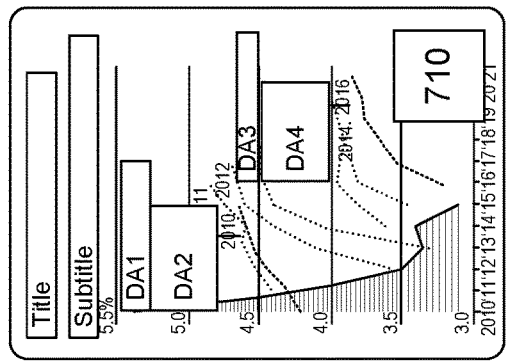
Input chart
Recommendations
FIG. 7A.

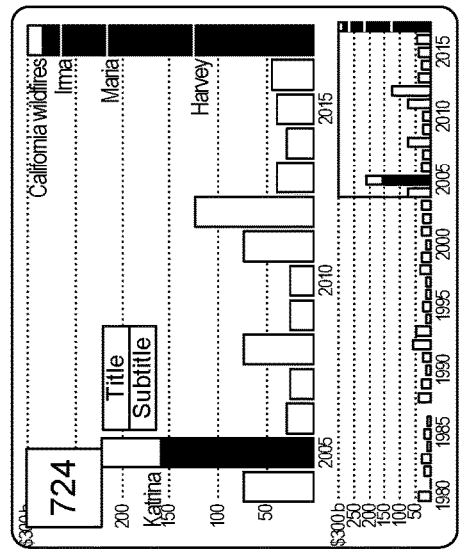
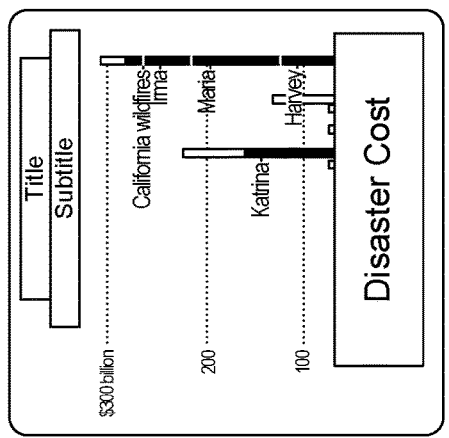
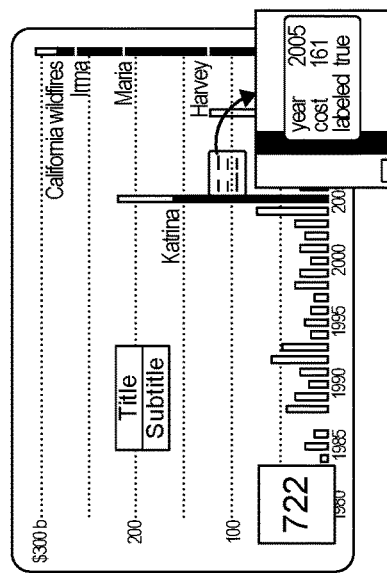
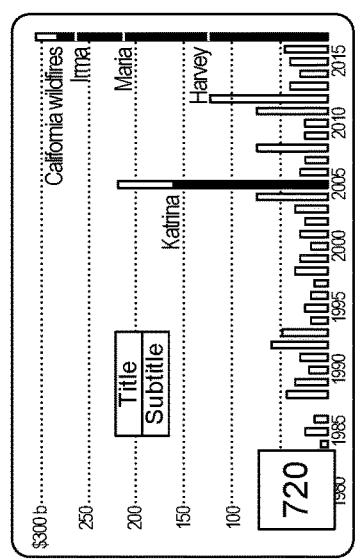
Input chart
Recommendations
FIG. 7B.

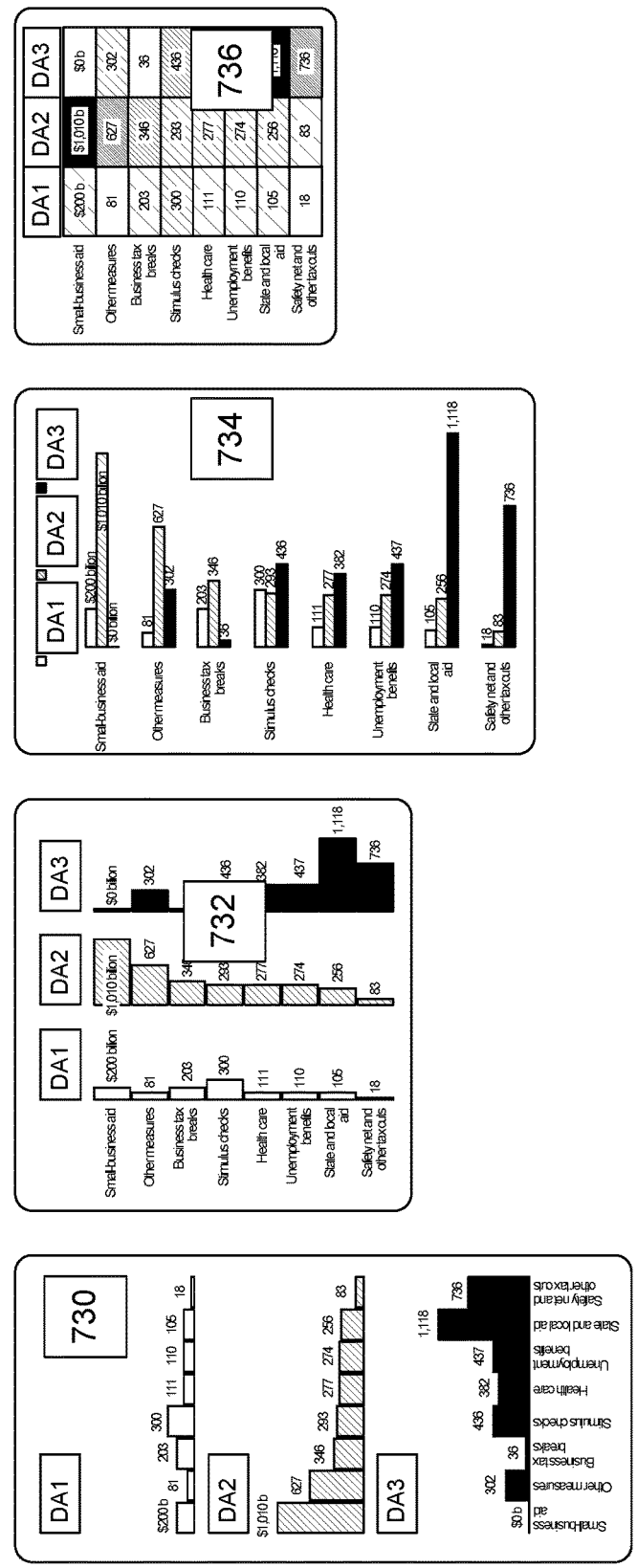
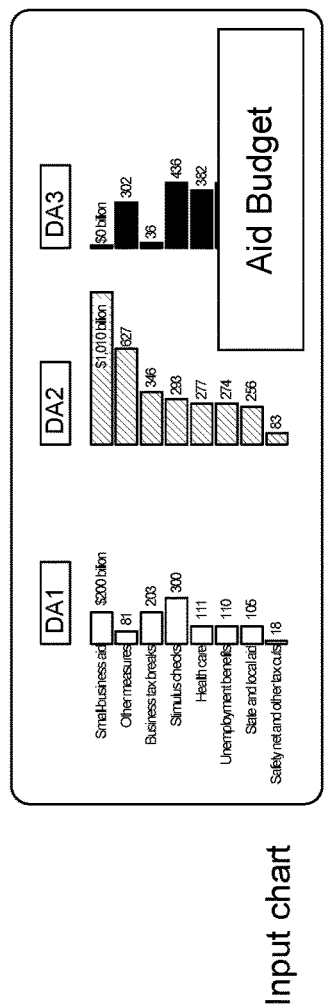
FIG. 7C.

RECOMMENDER FOR RESPONSIVE VISUALIZATION TRANSFORMATIONS

BACKGROUND

Data visualizations (or visualizations) represent data using graphical marks (bars, lines, points, etc.) that visually represent different aspects of the data. The marks can be assigned various visual attributes (e.g., position, shape, size, color, opacity, tooltip text to display upon mouse over) that operate as encoding channels for different data attributes.

Responsive design is a design technique that adapts content for different contexts such as different screen types, devices, device locations, etc. Responsive data visualizations (or responsive visualizations) adapt visualization content for different screen types, and are useful for representing data-driven web content due to an increasing proportion of mobile viewers. More specifically, because of increasing mobile access to data-driven web content, responsive visualizations (e.g., providing multiple versions of the same visualization optimized for different screen sizes) can enhance the effectiveness of data-driven communication across many domains.

However, responsive visualization authoring environments tend to require considerable manual effort on the part of visualization designers. The process of designing responsive visualizations may start with a particular source visualization, and then consider ways to modify the source visualization to make it suitable for a different screen size. Conventionally, designing responsive visualizations is a manual process where visualization designers think about how a visualization might look on different screens, consider different arrangements, and manually implement one or more different arrangements. Manually designing responsive visualizations is usually a painful process because it typically requires manual exploration and evaluation through a large design space of responsive visualization strategies.

SUMMARY

Embodiments of the present invention are directed to generating and recommending responsive visualizations. In an example embodiment, a design specification of a source visualization and an author's preferences are used to identify and rank compatible sets of candidate responsive transformations (e.g., using answer set programming (ASP)). Each set is evaluated and ranked according to one or more cost metrics that quantify changes in information density, changes to how a visualization communicates information, and/or popularity of a transformation. Some embodiments generate a transformation specification in a declarative grammar that represent the sets of candidate responsive transformations independent of the structure of the source visualization specifications, compile each transformation specification and source visualization specification into a rendering grammar specification, and generate a responsive visualization by compiling the rendering grammar specification using a rendering grammar compiler. In some embodiments, the highest ranked responsive visualizations are presented as authoring recommendations and/or the highest ranked responsive visualization is automatically selected and applied.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein:

FIG. 4 illustrates example techniques for specifying responsive transformations, in accordance with embodiments of the present invention;

FIG. 5A illustrates an example responsive transformation, FIG. 5B illustrates example role expressions, and FIG. 5C illustrates example transformation rule objects, in accordance with embodiments of the present invention;

FIG. 6 illustrates example transformation rule objects, in accordance with embodiments of the present invention;

FIGS. 7A-7C example responsive visualization recommendations, in accordance with embodiments of the present invention;

DETAILED DESCRIPTION

Overview

Figure 1:
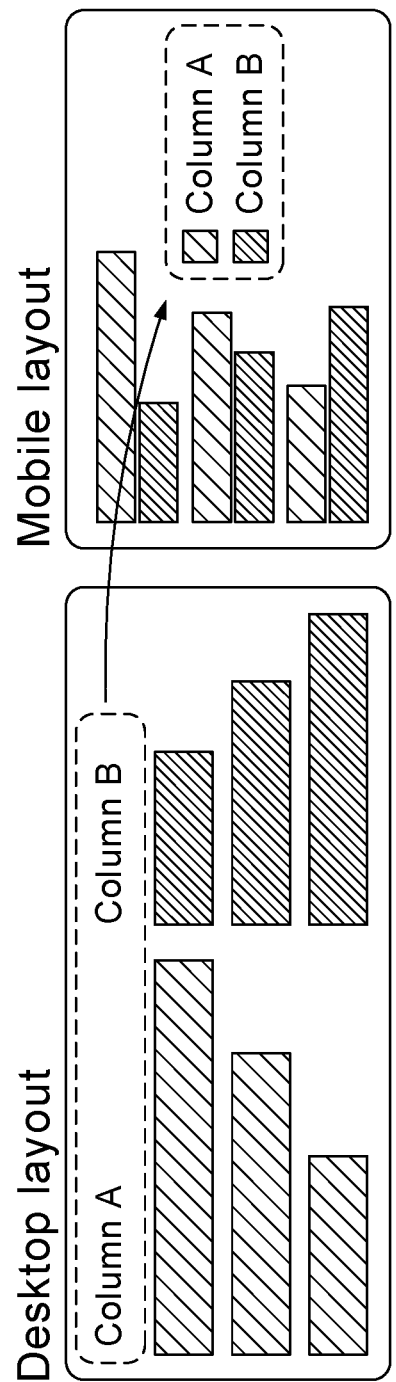
FIG. 1 is an illustration of example responsive visualizations, in accordance with embodiments of the present invention.

To create multiple versions of the same visualization for responsive contexts, visualization authors often start by designing a source visualization (or source view), making copies, and then applying different edits to different copies of the visualization to produce different target visualizations (or target views) optimized for different screen types. FIG. 1 is an illustration of example responsive visualizations that visually represent the same underlying data in different ways. In this example, a desktop layout arranges two bar graphs in columns with column headings, while the corresponding mobile layout collapses the two columns into one and moves the column headings into a legend.

Manually creating multiple versions of the same visualization is often tedious, as authors must manually explore, apply, and evaluate different responsive strategies one by one. For example, an author might need to create responsive visualizations by handling a different artboard and/or specification for each responsive visualization, which can introduce substantial rework if one of the responsive visualizations is revised. Furthermore, the search space of candidate responsive transformations is often too large for an individual author to thoroughly explore. Authors often have difficulty expressing desired changes using conventional visualization specifications. Moreover, responsive transformations often cause changes to the visualization takeaways, and it is difficult for an individual author to approximate how much visualization messages may change between designs.

While there are some existing visualization authoring tools, they are limited in important ways. For example, existing visualization design recommenders typically provide visualization recommendations without considering screen or visualization size. As a result, existing visualization design recommenders are not particularly useful for responsive design and often result in ineffective designs that make it hard to identify visual information on certain screens.

Existing approaches for automating responsive visualizations are also limited in important ways. Some prior techniques allow authors to manually resize a visualization, apply global edits to simultaneous previews, or view potential responsive visualization design patterns. However, to our knowledge, none of the prior techniques generate ranked responsive visualization recommendations. One prior technique generates (unranked) responsive visualizations, but relies on a computationally complex comparison between source and target visualizations. Furthermore, that prior technique is substantially limited in the types of responsive visualizations it can be used to author, as it has a specific implementation that directly manipulates visualization specifications for four specific chart types (scatterplot, line chart, bar chart, and heatmap) and four visual mark attributes (position, color, size, and shape). As a result, this prior technique cannot be used for other chart types, visual attributes, or transformation strategies, including strategies that are often desired for responsive designs, like repositioning annotations or rescaling map visualizations. In other words, conventional techniques for generating responsive visualizations do not generalize to other types of transformations that are often desirable.

Furthermore, existing declarative visualization grammars used by conventional responsive visualization authoring tools are often limited when it comes to supporting expressive responsive visualization designs. For example, commonly desired responsive visualization strategies like fixing a tooltip position, aggregation, internalizing labels, and externalizing annotations are often unsupported or overly complicated to specify with existing declarative visualization grammars. In addition, many visualization grammars require authors to define multiple full visualization specifications for each responsive visualization, which often makes it difficult to propagate changes from one visualization to another. Many prior techniques make it difficult or even impossible to express a large set of candidate transformations, like transposing layout or changing mark types, significantly limiting their utility.

Indeed, conventional declarative visualization grammars are not particularly suited to representing visualization transformations. On the contrary, different edit properties for text and marks in conventional declarative visualization grammars often complicate the process of creating specifications for multiple versions of a visualization. And although many responsive visualization strategies can be written in conventional declarative visualization grammars, these representations require high complexity and are therefore computationally inefficient.

As such, there is a need for improved responsive visualization authoring tools and/or improved declarative visualization grammars that can simplify the computational process involved in generating responsive visualizations, and that can help visualization authors to more effectively develop responsive visualizations.

Accordingly, embodiments of the present invention are directed to generation and recommendation of responsive visualizations. In some embodiments, a design specification of a source visualization and an author's preferences for responsive visualizations are used to generate and rank compatible sets of candidate responsive transformations. In an example implementation, each set of candidate responsive transformations is evaluated and ranked according to one or more cost metrics that quantify changes in information density, changes in how a visualization communicates information, and/or frequency or popularity of the transformation. Some embodiments generate transformation specifications that represent the sets of candidate responsive transformations in a declarative grammar independent of the structure of the source visualization specifications, compile each such declarative transformation specification into a rendering grammar specification, and generate a responsive visualization by compiling the rendering grammar specification using a rendering grammar compiler. In some embodiments, the highest ranked responsive visualizations are presented as authoring recommendations and/or the highest ranked responsive visualization is automatically selected and applied.

In some embodiments, a declarative grammar is used to represent responsive transformations independent of the structure of the specification of the source visualization. In an example implementation, a set of responsive transformations is represented with a configuration object and one or more transformation rules. An example configuration object contains configurable metadata representing the context for a desired target view (e.g., characteristics of the target environment, such as media type, screen size, visualization size). Example transformation rules are represented using a list structure, where each rule describes a single responsive change to the source visualization, enabling reusability of the transformation rules for different source visualizations. In an example implementation, each rule is represented with a rule object comprising a specifier (which elements to change), an action (how to change the elements), and an option (what properties to change). In some embodiments, the specifier queries the source visualization specification to identify a set of existing visualization elements to be transformed (e.g., all marks), the action provides a high-level instruction about the change to be made to the selected elements (e.g., modify), and/or the option provides detailed information about the change to be made to the selected elements (e.g., color=blue).

Unlike prior techniques, the flexible specifier syntax enables querying visualization elements using their role (e.g., mark, axis labels, title), underlying data, and/or attributes of visualization elements, independent of the structure of a source view specification. Additionally or alternatively, a compact set of action predicates (e.g., add, duplicate, remove, replace, swap, modify, reposition, and transpose) are provided, enabling authors to encode a diverse range of transformation techniques. Implementations that represent responsive transformations using a declarative grammar syntax such as this support extracting and reusing generalizable transformation strategies across multiple responsive specifications, improving computational efficiency over prior techniques. And since a declarative grammar syntax such as this is agnostic to the underlying structure of a source visualization, it can be modularized and implemented in a wide variety of visualization authoring tools and adapted to translate into any desired rendering grammar by developing a corresponding compiler that converts transformation specifications in the declarative grammar into target visualization specifications in the desired rendering grammar. Furthermore, implementations that encode responsive transformations and evaluate them using one or more cost metrics significantly reduce the amount of required computation over prior techniques.

Generating and/or recommending responsive visualizations has a variety of applications. In an example use case, an analytics application uses the present techniques to ensure that visualizations are displayed effectively across different usage contexts (e.g., between dashboards and mobile apps). In another example use case, a design application uses the present techniques to adapt multimedia content (e.g., social media posts and stories, invitations, and marketing materials like logos, flyers, and banners) for different presentation contexts. In another use case, a presentation tool uses the present techniques to enhance business communications with customers and colleagues using data visualizations adapted to various presentation or mobile devices. In yet another example use case, narrative publishing tools use the present techniques to create data-driven stories by incorporating responsive features to ensure that the content can reach a wider audience. These are just a few examples, and other use cases are contemplated within the scope of the present disclosure.

As such, using implementations described herein, a user can efficiently and effectively author responsive visualizations in a variety of applications.

Example Responsive Visualization Environment

Figure 2:
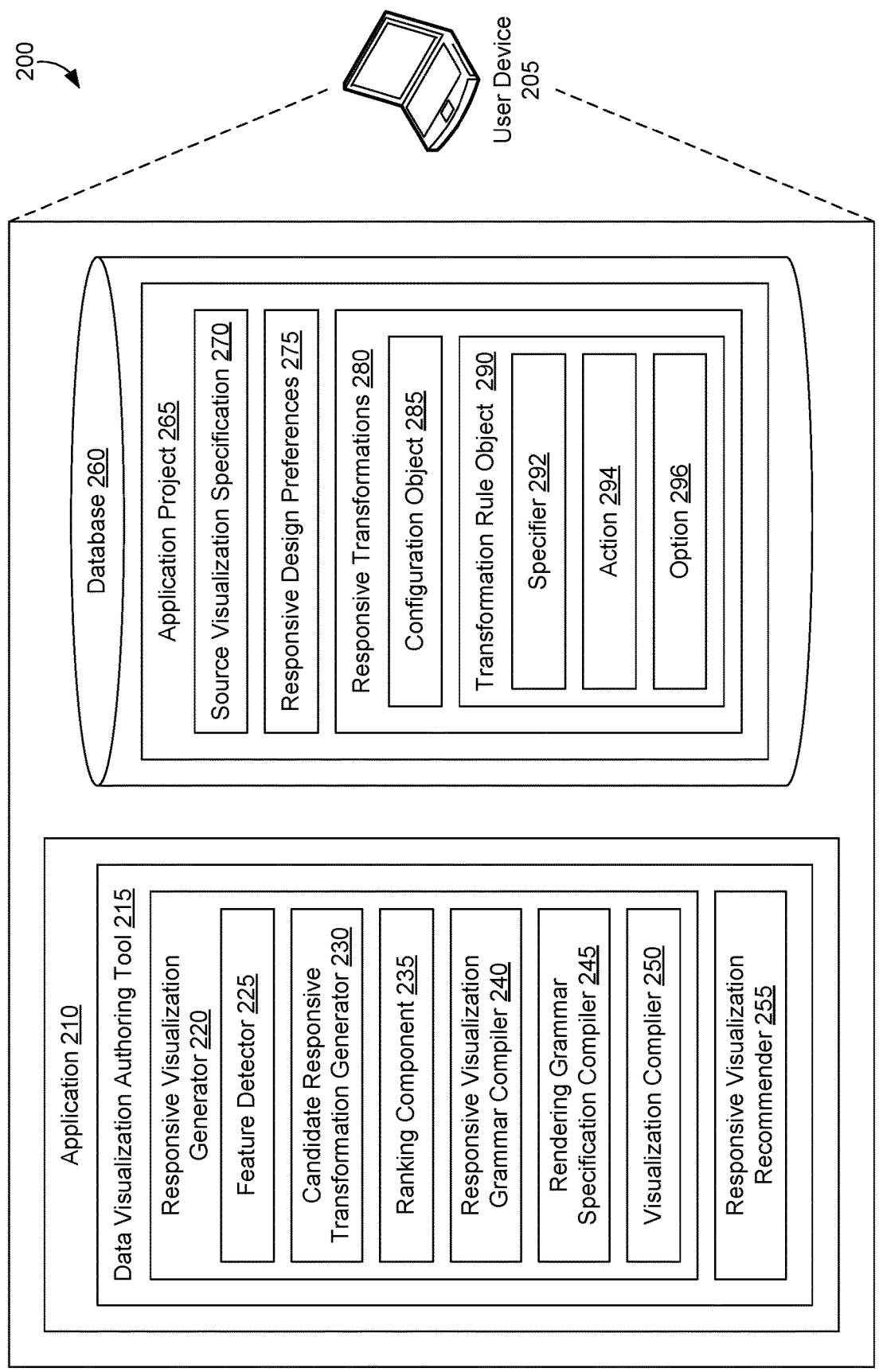
FIG. 2 is a block diagram of an example responsive visualization system, in accordance with embodiments of the present invention.

Referring now to FIG. 2, a block diagram of example environment 200 suitable for use in implementing embodiments of the invention is shown. Generally, environment 200 is suitable for authoring or generating responsive visualizations, and, in some embodiments, facilitates generating, ranking, and/or presenting recommendations for responsive visualizations.

At a high level, environment 200 includes user device 205. Depending on the embodiment, user device 205 is any kind of computing device capable of facilitating generation or authoring of responsive visualizations. For example, in an embodiment, user device 205 is a computing device such as computing device 1100, as described below with reference to FIG. 11. In some embodiments, user device 205 a personal computer (PC), a laptop computer, a mobile or mobile device, a smartphone, a tablet computer, a smart watch, a wearable computer, a personal digital assistant (PDA), a music player or an MP3 player, a global positioning system (GPS) or device, a video player, a handheld communications device, a gaming device or system, an entertainment system, a vehicle computer system, an embedded system controller, a camera, a remote control, a bar code scanner, a computerized measuring device, an appliance, a consumer electronic device, a workstation, or any combination of these delineated devices, or any other suitable computer device.

In various implementations, user device 205 and/or other components of environment 200 that are not illustrated in FIG. 2 include computer storage media that stores information including data, data structures, computer instructions (e.g., software program instructions, routines, or services), and/or models (e.g., 3D models, machine learning models) used in some embodiments of the technologies described herein. For example, in some implementations, user device 205 comprises a data store (or computer data memory), such as database 260. Further, although user device 205 is depicted as a single component in FIG. 2, in some embodiments, user device 205 and/or database 260 are implemented using any number of data stores (e.g., using local and/or cloud storage), and/or any data or components described herein are stored on any suitable data store(s) and any suitable device(s).

In an example embodiment, user device 205 is in communication with one or more computing devices such as a server (not shown in FIG. 2) via a network. In some non-limiting example implementations, the network includes one or more local area networks (LANs) and/or wide area networks (WANs). Such networking environments are commonplace in offices, enterprise-wide computer networks, intranets, and the Internet.

In the example illustrated in FIG. 2, user device 205 includes application 210 with data visualization authoring tool 215. In some embodiments, data visualization authoring tool 215 and/or any of the elements illustrated in FIG. 2 are incorporated, or integrated, into an application(s), or an add-on(s) or plug-in(s) to an application(s), such as application 210. In some embodiments, the application(s) is a stand-alone application, a mobile application, a web application, or the like. For example, in some implementations, the application(s) comprises a web application that runs in a web browser and/or is hosted at least partially server-side. In some cases, the application is integrated into an operating system (e.g., as a service). Example applications include digital content and asset management applications such as Adobe Experience Platform (AEP), design or publishing applications such as Adobe Creative Cloud Express® (Adobe® Spark), InDesign®, Adobe® XD, or Dreamweaver® to name a few examples. Although some embodiments are described with respect to an application(s), some implementations additionally or alternatively integrate any of the functionality described herein into an operating system (e.g., as a service), a server (e.g., a remote server), a distributed computing environment (e.g., as a cloud service), and/or otherwise.

Depending on the embodiment, various allocations of functionality are implemented across any number and/or type(s) of devices. In the example illustrated in FIG. 2, data visualization authoring tool 215 (or some portion thereof) is integrated into an application (e.g., application 210) executable on a single device. In another example, one or more components of data visualization authoring tool 215 (or some portion thereof) are distributed across some other number and/or type(s) of devices (e.g., hosted on a server) and coordinate via a network to execute the functionality described herein. These are just examples, and any suitable allocation of functionality among these or other devices is possible within the scope of the present disclosure.

To begin with a high-level overview of an example workflow through the configuration illustrated in FIG. 2, a user operating user device 205 uses application 210 to create, open, or otherwise access application project 265, uses data visualization authoring tool 215 to access, design, draw, specify, import, or otherwise identify a source visualization (e.g., source visualization specification 270), data represented by the source visualization, type or visual attributes of the source visualization (e.g., type of graphical mark such as bars, lines, points), and/or associations between data attributes and corresponding encoding channels of graphical marks (e.g., position, shape, size, color, opacity, tooltip text to display upon mouse over), and data visualization authoring tool 215 stores or otherwise associates a corresponding representation(s) in or with application project 265. In some embodiments, data visualization authoring tool 215 provides a graphical user interface with various authoring tools with which the user draws or otherwise specifies a visualization, and data visualization authoring tool 215 generates source visualization specification 270 (e.g., represented in a rendering grammar) based thereon. In some embodiments, data visualization authoring tool 215 provides a text editor or software development interface that accepts text input representing the source visualization specification 270 directly.

In some embodiments, data visualization authoring tool 215 provides one or more menus, tools, buttons, fields, or other interface elements with configurable options that accept input specifying responsive design preferences 275. Example preferences include target size for a responsive visualization, transformation strategies the user prefers or wants to avoids (e.g., hard constraints), and/or a subset of data that can be omitted (e.g., for transformations to smaller screens) or added (e.g., for transformations to larger screens). In some embodiments, data visualization authoring tool 215 accepts input specifying hard constraints on transformation strategies, such as whether to allow for transposing axes, changing encoding channels, modifying mark types, altering the aspect ratio, and/or others. For example, if an option to "allow for modifying mark type" is set as false, then recommendations with changes to mark type are ignored. In an example implementation, data visualization authoring tool 215 accepts input specifying a subset of data to omit or add using a filter statement.

Given source visualization specification 270 and responsive design preferences 275, responsive visualization generator 220 generates one or more responsive visualizations (e.g., upon selection of an option by the user, automatically upon creation of the source visualization or while the source visualization is being created). Depending on the implementation, responsive visualization recommender 255 presents responsive visualizations as recommendations and accepts input selecting one (or more) responsive visualizations. In some embodiments, data visualization authoring tool 215 identifies and automatically selects a responsive visualization. In an example implementation, when application project 265 is completed (e.g., upon user input selecting a save or export command), data visualization authoring tool 215 generates different versions (e.g., desktop and mobile) of the content represented by application project 265 (e.g., a website, ad, social media post, presentation), one for each responsive visualization in application project 265. In some embodiments, application 210 (or some other application) provides the different versions of the content, for example, to a server that hosts the different versions and distributes an appropriate version responsive to the device type or screen size of a requesting device.

In the example implementation illustrated in FIG. 2, data visualization authoring tool 215 includes feature detector 225, candidate responsive transformation generator 230, ranking component 235, responsive visualization grammar compiler 240, rendering grammar specification compiler 245, and visualization compiler 250. At a high level, feature detector 225 evaluates and detects features from source visualization specification 270. Candidate responsive transformation generator 230 evaluates the detected features and responsive design preferences 275 to identify an applicable and compatible set(s) of encoded responsive transformations. Ranking component 235 ranks sets of candidate responsive transformations based on one or more costs (e.g., density, message, preference). Responsive visualization grammar compiler 240 converts each (e.g., top) set of candidate responsive transformations into a declarative transformation specification using a responsive visualization grammar. Rendering grammar specification compiler 245 converts each declarative transformation specification into a rendering grammar specification. Visualization compiler 250 draws (e.g., renders) a visualization from a rendering grammar specification.

In some embodiments, data visualization authoring tool 215 represents, identifies, evaluates, and/or otherwise processes candidate responsive transformations (e.g., responsive transformations 280) using a declarative grammar capable of expressing various responsive transformations in a manner that is independent of the source visualization specification. Such a declarative grammar can be thought of as a responsive visualization grammar.

Figure 3:
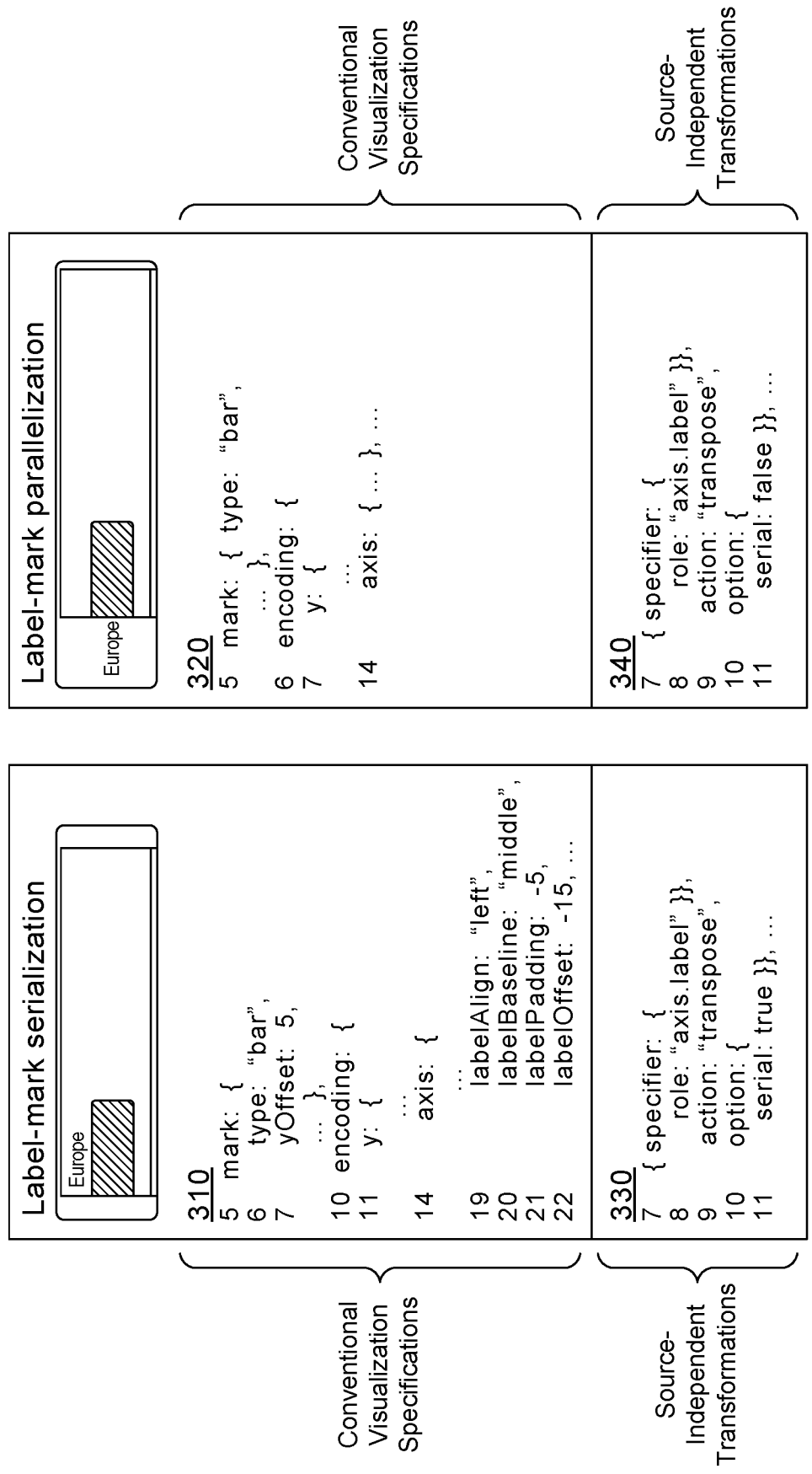
FIG. 3 illustrates example visualization specifications that use a declarative grammar, in accordance with embodiments of the present invention.

By way of comparison, FIG. 3 illustrates example visualization specifications that use a declarative grammar. In FIG. 3, source visualization specifications 310 and 320 are excerpts of full source visualization specifications that each define a complete visualization. As shown in FIG. 3, serializing labels and marks using source visualization specification 310 requires layout adjustment keywords (lines 7, 19-22), while parallelizing them (source visualization specification 320) does not need a particular expression (line 14). Conventionally, there is no way to transform source visualization specification 310 from serializing to parallelizing labels and marks, or vice versa, using conventional techniques without directly modifying the relevant lines and generating a complete version of a transformed visualization specification. In other words, conventionally, there is no transformation that can be applied independent of source visualization specification 310 to arrive at source visualization specification 320.

On the other hand, a declarative grammar for responsive transformations can express the same strategies in a simpler way. As shown in FIG. 3, source-independent transformations 330 and 340 define transformations using representations that are independent of the source visualization, obviating the need to compose a separate full specification for each responsive view. Such an approach can help visualization authors easily and quickly compose responsive design specifications and can help developers to more effectively develop authoring tools for responsive visualization.

Guidelines for Responsive Visualization Grammar. Some possible guidelines for evaluating a responsive visualization grammar include expressiveness (C1), flexibility (C2), and reusability (C3).

In some cases, an expressive (C1) responsive visualization grammar is able to express a diverse set of responsive design strategies spanning different visualization elements. One approach is to characterize a responsive transformation strategy as a tuple of the visualization element(s) to change and a transformation action. In some cases, selecting visualization element(s) supports varying levels of customization for responsive transformations because transformations can include both systematic changes (e.g., externalizing all text annotations or shortening axis labels) and individual changes (e.g., externalizing a subset of annotations or highlighting a particular mark). In some cases, a grammar expresses responsive transformations as a concise set of "actions" describing how visualization elements are changed. As such, in some cases, an expressive grammar provides (1) query syntax for selecting visualization elements both systematically and individually and (2) consistent, high-level action predicates that can encode a diverse set of design strategies.

In some cases, a flexible (C2) responsive visualization grammar offers flexibility in how an author can specify the behavior of an entity under a responsive transformation, independent of how the entity is expressed in the specification (or structure) of the source visualization. For example, suppose a visualization that has a nominal color encoding that maps dog, cat, and fox to red, blue, and green. Then, to select red marks, some authors can specify simply "red marks" (using attribute) while others can make the same selection by specifying "marks for dog" (using data). Furthermore, responsive transformations can occur across different visualization elements. For instance, as illustrated in FIG. 1, an author might change a visualization layout by moving a column element to the row (partial view transpose) to accommodate a portrait aspect ratio. Following the previous transformation, assume an author wants to replace the column labels with a legend if there is a redundant mark property encoding. As such, in some cases, to be flexible (C2), a responsive visualization grammar supports multiple expressions for specifying visualization elements that can be independent of the structure of a visualization.

In some cases, a reusable (C3) responsive visualization grammar enables authors to reapply generalizable responsive transformations across different visualizations (e.g., without requiring substantial changes). While reusability may be more straightforward in certain circumstances (e.g., for visualizations sharing the same properties), many responsive designs utilize generic transformations that can be conceptualized independently from the specific chart design, data, or base visualization (e.g., transposing the layout, numbering annotations, using a fixed tooltip position). Moreover, authors might want to repeat techniques only for certain features of a visualization (e.g., removing a data field regardless of chart type). As such, in some cases, to be reusable (C3), a responsive visualization grammar represents each responsive transformation in a form that helps users to extract and apply to other views.

With these guidelines in mind, consider two possible approaches for specifying responsive transformations: (1) prior techniques in which a complete visualization specification is decorated and (2) defining responsive transformations separate from or independent of a source visualization specification. The first approach uses conditional keywords (e.g., media_rule) to express transformations. For example, in column 410 of FIG. 4, the media_rule keywords for the x (line 5-7) and y (line 10-12) encodings describes the changes for each encoding when viewed in a media format (e.g., a "swap" action). The media_rule keywords for the y axis (line 15-17) and the size legend (line 21-22) describe the same change to the label format for both types of elements. Column 420 illustrates the same set of transformations, but directly declares that the two position channels should be swapped and concisely describes changes to the label format for all text elements.

Using prior techniques in which a complete visualization specification is decorated can often be tedious, and it is often unclear how to specify responsive transformations that apply to multiple elements. For example, decorating a complete visualization specification often requires a single responsive change (e.g., transposing an axis) to be interleaved across multiple parts of the specification (column 410, Line 5-7 and 10-12). In contrast, separately defining responsive transformations can enhance the reusability (C3) of a transformation specification by separating the desired responsive changes from the original visualization design. Furthermore, separately defining responsive transformations can support more generalizable transformations that are independent of the original visualization structure (C2; e.g., changing all text formats directly). As such, some embodiments use a declarative grammar that represents responsive transformations separately from and/or independent of the original visualization structure.

Example Responsive Visualization Grammar. In some embodiments, a responsive visualization grammar uses a declarative grammar to express or specify responsive transformations. Paired with a declarative specification for a source visualization, the responsive visualization grammar provides a concise syntax to describe responsive changes independent of the structure of the original visualization specification. In some embodiments, a responsive transformation specification (e.g., representing a set of responsive transformations 280) comprises a configuration object (e.g., configuration object 285) and one or more transformation rules (e.g., transformation rule object 290). An example configuration object contains configurable metadata representing the context for a desired target view (e.g., characteristics of the target environment, such as media type, screen or visualization size). Example transformation rules are represented using a list structure, where each rule describes a single responsive change to the source visualization, enabling reusability of the transformation rules for different source visualizations (C3).

In an example implementation, each rule is represented with a rule object comprising a specifier (which elements to change), an action (how to change the elements), and/or an option (what properties to change). In some embodiments, the specifier (e.g., specifier 292) queries the source visualization specification to identify a set of existing visualization elements to be transformed (e.g., all marks), the action (e.g., action 294) provides a high-level instruction about the change to be made to the selected elements (e.g., modify), and/or the option (e.g., option 296) provides detailed information about the change to be made to the selected elements (e.g., color=blue). Together, the action and option can encode a wide range of transformations to elements selected by the specifier (C1: expressive). For example, in FIG. 5A, the rule object in line 6-9 of transformation specification 510 states that the compiler should "modify" (action) the "mark" (specifier)'s "color" to be "red" (option).

Specifier. In some embodiments, a specifier indicates which elements to transform on the target visualization. In an example implementation, a specifier only expresses existing element(s) from the target view, which the compiler then uses to identify the corresponding element(s) and extract relevant properties. Authors tend to apply responsive transformations to groups of element(s) sharing the same role, such as axis labels, mark tooltips, or legend marks. In addition, authors may want to include transformations specific to some data features (e.g., mark labels for specific data points, the axis corresponding to a particular data field) and/or the visual attributes of the visualization element(s) (e.g., red-colored bars). As such, in some embodiments, to express visualization elements using different characteristics, a specifier is declared by structure, data, and attribute queries.

Structure query: Some declarative visualization grammars define roles for visualization elements (e.g., marks, axes, or legends). Structure queries identify elements based on this role, and provide additional flexibility for selecting and grouping elements in different ways, regardless of how they are defined in the original visualization specification (C2: flexible). In an example implementation, keywords for structure queries include role, mark, index, and/or id.

In some embodiments, the role keyword specifies the role of a visualization element. FIG. 5B illustrates example role expressions 520, in accordance with embodiments of the present invention. In an example implementation, the role is cascaded to specify subordinate elements like "mark.label" for labels associated with the visualization marks or "legend.mark" for legend marks. In some embodiments, for brevity, cascaded role keywords are shortened when its parent role is unambiguous (e.g., "layer.mark" as "mark"; "view.row" as "row"). In an example implementation, the mark keyword specifies the type of mark, which is useful when there are multiple mark types in a visualization. The index keyword indicates the specific element to select from a group of related elements (e.g., {role: "title", index: 1} selects the second title element). In an example, values such as "first" or "last" indicate the first and last element, respectively, and/or "even" and "odd" express every other (even and odd) element, respectively. In an embodiment, the id keyword selects informational marks (emphasis) by their defined names or identifiers (e.g., line 43 of transformation rule object 530 in FIG. 5C).

Data query: In some embodiments, a data query references a subset of data (data), a data field (field), the type of a variable (datatype), and/or values for elements (values) to support varying levels of customization in selecting visualization elements (C1: expressive). In an example implementation, the specifier {role: "mark", data: {price: 30}} selects all marks that encode a price value of 30. In another example, the specifiers {role: "axis", field: "price"} express axes for the price field; {role: "legend", datatype: "nominal"} selects legends for nominal data variables. In some embodiments, a values keyword expresses a subset of values for a reference element that is associated with a certain data field like axis and legend. In an example implementation, the specifier {role: "axis.label", values: [30, 50]} indicates the labels of an axis that encode value of 30 or 50. Similar to the index keyword for a structural query, some implementations use "even and "odd" to specify every other (even and odd) value element. In order to support more complex data queries, some embodiments provide a set of logical (e.g., NOT, AND, OR), arithmetic (e.g., =, ≠, ≤, ≥, ≤, ≥), and/or string operations (e.g., startsWith, includes, endsWith, regex pattern) composed to further select and filter elements based on properties of the data (C2: flexible).

Attribute query: In some embodiments, an attribute query references visualization elements based on their properties or attributes. Example attribute query keywords for identifying properties of visualization elements include: channel, operation, and/or interaction. In an example implementation, the channel keyword indicates whether the element has a certain encoding channel. For instance, specifiers {role: "layer", channel: "color"} and {role: "legend", channel: "color"} indicate layers and legends with a color encoding channel, respectively. In some embodiments, the operation keyword captures the type of data transformation operations applied to the elements (e.g., filter, aggregate), and/or the interaction keyword expresses the type of interaction features (e.g., zoom, interactive filter). Some embodiments additionally or alternatively support the use of style and/or position attribute keywords such as color, font size, orient, relative positions, and/or others. For marks, some embodiments use those style attributes to indicate mark properties (e.g., static color value or color encoding channel). For example, {role: "mark", color: "red"} indicates red colored marks.

Action and option. In some embodiments, the action indicates how to change the elements queried by a specifier. An example set of action predicates that can encode a large range of transformations (C1: expressive) include modify, reposition, transpose, add, duplicate, remove, replace, and/or swap.

In some embodiments, the option object in a rule further details the change indicated by the action. In some cases, some structure of an option object is the same as a specifier, but the structure and keywords vary based on the type of action. In an example implementation, keywords used in an option object indicate the properties or subordinate elements of the elements that were identified by the specifier (e.g., axis labels are subordinate elements of an axis), and a compiler interprets an option object with regard to the specifier.

For example, some embodiments use the role keyword to specify subordinate elements in an option object. In an example implementation, an option {role: "label"} means legend labels if the specifier is {role: "legend"} or mark labels if the specifier is {role: "mark"}, while the color keyword in line 13 in transformation rule object 530 of FIG. 5C expresses the color property of marks (specifier)'s labels (option). In some cases, when an option does not include the role keyword, then the properties in the option indicate those of the element specified by the specifier. For example, in line 8-9 of transformation specification 510, the "color" is the color of "mark" (the specifier). In some embodiments, when role values are used as a keyword in the option, they indicate the subordinate elements of the element specified by the specifier. For instance, in transformation rule object 530, line 5 and 6 mean the color of the axes (specifier)'s labels and domain lines (option), respectively, while the entire transformation rule (line 1-6) states that the compiler should specify all the axes in the chart, and modify their labels' color to be blue and their domains to be red.

In some embodiments, a modify action changes the properties of an element to specific values, with an associated option object for expressing attributes of the elements selected by the specifier. For instance, some embodiments modify the color of mark labels using the rule in line 8-13 of transformation rule object 530. To make relative changes, including adding or multiplying an attribute value by some value, some embodiments use by and prod operators, respectively. For instance, some embodiments express modifying the size of the specified marks by subtracting 30 as {specifier: {role: "mark"}, action: "modify", option: {size: {by: −30}}}.

In some embodiments, a reposition action is a special type of the modify action designed to more intuitively support common transformations related to position properties like absolute positions (x, y), relative positions (dx, dy), externalization (external, internal), and/or the like. For example, some embodiments express externalizing text annotations out of the chart in line 14-18 of transformation rule object 530. Some embodiments use a modify action to change the style and position properties together.

In some embodiments, a transpose action expresses the relative position of a pair of elements, the relationship of which is defined a priori, like two positional axes (x and y), labels associated with an axis or marks. A transpose action helps simplify expressions for relational properties. For example, the rule in line 20-22 of transformation rule object 530 transposes the entire visualization. The equivalent is to swap the x and y position channels in layers, which is expressed in line 24-28. To serialize labels to their marks, some embodiments use the rule in line 30-33 with a serial keyword in the option. This behavior is the same as adjusting the label positions (relative x and y values) and mark offsets.

In some embodiments, an add action adds new elements in a visualization. In some embodiments in which a specifier only expresses existing elements, the newly added elements are provided in an option object. For example, to express "add values of 50 and 60 to axis", some embodiments use the rule in line 35-38 of transformation rule object 530. In some embodiments, when the existing axis selected by the specifier (line 36) has ticks and labels for each axis value, then the rule adds ticks and labels for those values specified in the option (line 38).

In some embodiments, a duplicate action copies the element identified by the specifier. If provided, in some implementations, an option indicates the properties for the duplicated element to change after duplication (e.g., repositioning the duplicated element in line 40-45 of transformation rule object 530). In this case, the option acts as a shortcut for a second modify transformation to update the newly added element.

In some embodiments, a remove action removes elements identified by the specifier when no option is provided; when included, the option specifies the properties or subordinate elements that should be removed from the elements identified by the specifier. For instance, line 47-51 of transformation rule object 530 removes all marks that include a color channel (no option is provided); to instead remove the color channel of these marks, some embodiments use an option (line 53-58).

In some embodiments, a replace action expresses changes to the function of an entity while retaining its attributes. Sometimes, a visualization author may wish to change the role of an element (e.g., change from axis labels to legends) or an encoding channel of the marks to use increased screen space efficiently. In some embodiments, there are two types of replace actions: replacing a property with another within an element and replacing the role of an element with another. For the first case, some embodiments use the from and to keyword to indicate the original property and the replacing property. For instance, converting a channel from color to size can be expressed as the rule in line 60-65 of transformation rule object 530. Second, authors often change the role of elements across the visualization structure, using an option to not be subordinate to the specifier. In that case, some embodiments use a to keyword to indicate that this rule is changing the structural property. For instance, some embodiments replace an axis for the field plan with a legend for the color channel (which is meaningful in some embodiments only when the color channel encodes the same field) by having a rule shown in line 67-74 of transformation rule object 530.

In some embodiments, a swap action exchanges two entities (roles and encoding channels) while retaining their properties, which shortens two replace actions and helps avoid potential conflicts. In some embodiments, while a swap action includes some similar option structure as a replace action, it uses an array to indicate properties to be swapped. For instance, to exchange the color and size channels, some embodiments use a swap action and an array-based option as shown in line 77-81 of transformation rule object 530.

Having described various aspects of an example responsive visualization grammar and returning now to FIG. 2, data visualization authoring tool 215 includes responsive visualization generator 220, and an example implementation of responsive visualization generator 220 represents, identifies, evaluates, and/or otherwise processes candidate responsive transformations (e.g., responsive transformations 280) using a responsive visualization grammar.

For example, assume a user has used data visualization authoring tool 215 to access, design, draw, specify, import, or otherwise identify source visualization specification 270. Assume further the user has used data visualization authoring tool 215 to configure responsive design preferences 275, such as a target size for a responsive visualization, a selection of transformation strategies the user prefers or wants to avoids (e.g., hard constraints), a subset of underlying data that can be omitted (e.g., for transformations to smaller screens) or added (e.g., for transformations to larger screens), and/or others. In an example embodiment, feature detector 225 evaluates and detects features from source visualization specification 270, and candidate responsive transformation generator 230 evaluates the detected features and responsive design preferences 275 to identify an applicable and compatible subset(s) of encoded responsive transformations, ranking component 235 ranks the sets of candidate responsive transformations based on one or more costs (e.g., density, message, preference), and responsive visualization grammar compiler 240 generates a representation of each set of candidate responsive transformations using a responsive visualization grammar. In an example implementation, feature detector 225 and/or candidate responsive transformation generator 230 use answer set programming (ASP) and an ASP solver to generate a search space of sets of candidate responsive transformations (corresponding to candidate responsive visualization designs), ranking component 235 evaluates, normalizes, and/or ranks the sets of candidate responsive transformations, and responsive visualization grammar compiler 240 converts the (e.g., top) set(s) of candidate responsive transformations into corresponding declarative transformation specifications in a responsive visualization grammar.

Generally, an ASP program expresses a logical problem using facts, rules, and/or constraints. A fact encodes a single statement using a predicate-argument structure. For example, a fact mammal(dog) means a "dog" is a "mammal". A rule makes an inference based on existing facts, resulting in more facts. For instance, a rule animal(A):— mammal(A) (where capital-letter arguments are variables) indicates if A is a "mammal" (body), then A is an "animal" (head). A constraint (headless rule) prevents a certain combination of facts. For example, a constraint:—mammal(A), aviary(A) means that it cannot be a case that A is both "mammal" and "aviary". Given facts, rules, and constraints, an ASP solver computes and generates a stable sets of facts such that no fact conflicts with another in each set, and no constraint is violated.

In some embodiments, feature detector 225 encodes a set of rules and/or constraints that detect features from source visualization specification 270 and responsive design preferences 275. By way of nonlimiting example, by looking at the number of rows and columns in source visualization specification 270, a rule detect (single_view):—n_rows(1), n_columns(1) detects that the view represented by source visualization specification 270 is a "single view" if there are only one row and column each. As such, feature detector 225 applies rules and/or constraints to detect various features from source visualization specification 270 and/or responsive design preferences 275.

In some embodiments, candidate responsive transformation generator 230 encodes a set of automatable transformation strategies (e.g., candidate responsive transformations), and encodes a set of rules that decide whether to apply the encoded candidate responsive transformations. In an example implementation, candidate responsive transformation generator 230 encodes one or more of the following candidate responsive transformations, where transformations denoted by M are for desktop-to-mobile transformations, those denoted by D are for mobile-to-desktop transformations, and the non-prefixed transformations can be applied to both directions of transformation: changes to layout (e.g., transposing axes, partial axes transpose, resizing the chart, e.g., proportionately or disproportionately), changes to data (e.g., M-omitting a specified subset of data, D-filtering in a specified subset of data), changes to mark properties and encoding channels (e.g., rescaling the size channel; M-removing detail encodings like image, color, and size; M-changing the mark type, e.g., from bar, line, scatterplot to heatmap; M-changing small multiples to a heatmap), changes to text elements (e.g., M-externalizing non-data/data annotations, M-numbering externalized data annotations, D-internalizing non-data/data annotations, M-wrapping text elements), changes to references (e.g., repositioning legends, M-serializing axis labels, D-parallelizing axis labels, M-converting axis labels to legends, M-removing every other axis labels, D-adding every other axis labels, adding ticks for mark labels), changes to interaction (e.g., M-fixing the tooltip position; D-unfixing the tooltip position; M-removing tooltip; D-adding tooltip; removing a context view; adding a context view, e.g., for time-serial visualizations; removing zoom; adding zoom, e.g., for map visualizations), and/or others.

In some embodiments, to decide whether to apply encoded candidate responsive transformations, candidate responsive transformation generator 230 encodes rules as a binary choice between applying and not applying each encoded candidate responsive transformation. In an example implementation, a rule do(text_wrap,T);dont(text_wrap,T):—detect(size_smaller),text(T) means when the intended chart size of the responsive view is smaller than the source, and there is a text element T, then either do or do not wrap T. Here, the predicates do and dont mean applying and not applying the strategy in its argument, respectively. This kind of disjunction rule enumerates different combinations of transformations. Some embodiments encode a set of constraints to prevent illegal combinations of transformations, and/or implement hard constraints based on transformations represented in responsive design preferences 275. For instance, a constraint:—text(T),field(F),do(text_wrap,T,F),do(remove_axis,F) indicates not to combine wrapping text element T for a field F with removing an axis for F. In an example implementation, a Python library such as Clingo is used as the ASP solver over these rules and constraints to identify one or more compatible sets of candidate responsive transformations (representing design alternatives for a responsive visualization). In some embodiments, each set represents which encoded candidate responsive transformations are to be applied and which are to be omitted.

In some embodiments, ranking component 235 encodes one or more costs, evaluates the sets of candidate responsive transformations using the one or more costs, and normalizes and/or aggregates the costs to rank the sets of candidate responsive transformations (e.g., the design alternatives). In an example embodiment, for each design alternative (set of candidate responsive transformations), ranking component 235 assigns one or more costs to the application or omission of each of the encoded candidate responsive transformations represented by the set. In some cases, these costs are normalized to be in the same scale, (normalized) costs of a particular type for the different transformations in a given set are aggregated, (normalized) costs of different types of (normalized) costs for a particular set are aggregated, and/or different types of (normalized) costs for a particular set are aggregated to generate a final cost for each set. In some cases, aggregation comprises using some mathematical or statistical measure such as a sum, average, mean, median, mode, and/or other aggregation technique.

In an example implementation, ranking component 235 evaluates each candidate responsive transformation based on: "popularity" cost (e.g., representing a measure of popularity or frequency of prior use of a candidate responsive transformation), density cost (e.g., representing changes in information density, where candidate responsive transformations that reduce information density are assigned lower cost than those that do not in a desktop-first pipeline, and vice versa in a mobile-first pipeline), message preservation costs (e.g., representing changes to how a visualization communicates information, where candidate responsive transformations (e.g., axis transpose, disproportional rescaling) are assigned costs based on the extent to which they are considered to impact the implied "message" of a visualization), and/or others. In an example embodiment, the higher density or preference cost is, the better, while the lower message cost is, the better.

Density cost. In some embodiments, for changes from bigger screen to smaller screen, if a candidate responsive transformation reduces the number of elements or spreads them on screen, ranking component 235 assigns it a density cost of 1, otherwise 0. For instance, a candidate responsive transformation of removing every other axis labels for mobile views has a density cost of 1 while not applying that strategy has a density cost of 0. In another example, for changes in the opposite direction, if a ranking component 235 increases the number of elements or gathers them on screen, ranking component 235 assigns it a density cost of 1, otherwise 0. In this case, adding an axis label between each pair of existing labels has a density cost of 1.

Message cost. The messaging of a visualization can be thought of as a measure of efficacy of communication, or the visualization's ability to communicate information such as comparisons or relationships. In some embodiments, ranking component 235 assigns a message cost of 1 for each transformation that is considered to change how a visualization supports communicating a message, for example, by omitting or adding information and interaction, adding to the amount of concurrent information within a single scroll height, reducing (e.g., disabling) the discoverability of information, impacting graphical perception (e.g., reducing aspect ratio changes), and/or others. In an example implementation, transposing an overly wide view to a longer visualization is assigned a message cost of 1 because it reduces the amount of information that is concurrently visible within a single scroll height. In some embodiments, ranking component 235 otherwise assigns a message cost of 0.

Preference cost. In some embodiments, to represent preferences in applying responsive transformations, ranking component 235 assigns a preference cost according to each candidate responsive transformation's popularity or frequency in published use cases (or as otherwise estimated). In an example implementation, if a particular candidate responsive transformation is found to have been applied with some threshold frequency (e.g., more than 50% of observed use cases), ranking component 235 assigns it a preference cost of 2, otherwise 0. In another example implementation, if a candidate responsive transformation is less commonly applied (e.g., more than 10% of observed use cases), ranking component 235 assigns it a preference cost of 1. In another example implementation, if a candidate responsive transformation is rarely used (e.g., less than 10% of the observed use cases), ranking component 235 assigns it a preference cost of 0, otherwise 2. For instance, disproportionate rescaling is a common transformation, so ranking component 235 assigns it a preference cost of 2 and a message cost of 1 (e.g., as it negatively impacts graphical perception). In some embodiments, the preference cost metrics are configurable based on a user's own preferences, style guidelines of an organization, and/or otherwise. In some embodiments, to prevent too many candidate transformations, ranking component 235 assigns a preference cost for a set of candidate responsive transformations based on some maximum count, such as 20−count(candidate responsive transformation).

Combining costs. In some embodiments, the three example costs described above result in different scales for each cost. As such, in some embodiments that combine them, ranking component 235 normalizes the costs for each candidate transformation (e.g., to be in the range from 0 to 1), finds the minimum and/or maximum transformation cost of each type across all the sets of candidate transformations (e.g., $\min_{density, ensity}$), and/or aggregates (e.g., averages) the transformation costs across the different transformations in each set for each type of cost. In some embodiments, for each set and each type of cost, ranking component 235 generates a normalized cost using the minimum and/or maximum transformation costs across all sets and the aggregated transformation cost for that type and that set. In an example implementation, ranking component 235 uses a normalization method (N (i, •)) to normalize costs for the i-th set of candidate responsive transformations using one or more of the following equations:

$$N(i, \text{density}) = \frac{\max_{density} - \text{density}(i)}{\max_{density} - \min_{density}} \quad (1)$$

$$N(i, \text{message}) = \frac{\text{message}(i) - \min_{message}}{\max_{message} - \min_{message}} \quad (2)$$

$$N(i, \text{preference}) = \frac{\max_{preference} - \text{preference}(i)}{\max_{preference} - \min_{preference}} \quad (3)$$

In Equation 1, the denominator is the difference between the max and min density costs, and the numerator is the difference between the max and i-th density costs. In Equation 2, the i-th normalized message cost is the difference between the i-th and min message costs divided by that between the max and min message costs. Similar to Equation 1, in Equation 3, the difference between the max and i-th preference costs is divided by the difference in max and min preference costs. In some embodiments, density and preference costs are maximized, and the normalization for the density and preference costs reverses the cost scale, so that the scales of the three costs have the same direction. As a result, these normalization methods make each of the three costs range from 0 (more desired) to 1 (less desired). In some embodiments, ranking component 235 uses the sum of these normalized costs as the final cost of the i-th set of candidate responsive transformations:

Cost(i)=N(i,density)+N(i,message)+N(i,preference)  (4)

As such, in some embodiments, ranking component 235 sorts the final costs for the different sets of candidate responsive transformations to identify the top n ranked sets of candidate responsive transformations.

In some embodiments, responsive visualization grammar compiler 240 generates a declarative transformation specification or some other representation of each selected set of candidate responsive transformations using a responsive visualization grammar. At a high level, in some embodiments, the declarative transformation specification for each set of responsive transformations 280 is independent of an upstream or downstream declarative grammar, such as a grammar used to represent source visualization specification 270, so it is compatible with any desired declarative grammar. Additionally or alternatively, in some embodiments, the declarative transformation specification is independent of a downstream rendering grammar used by visualization compiler 250, so it is capable of translation into—and therefore compatible with—any desired rendering grammar (e.g., by a corresponding rendering grammar specification compiler 245 designed to translate into the desired rendering grammar) and a corresponding visualization compiler 250.

Example Responsive Visualization Grammar Compiler. In some embodiments, responsive visualization grammar compiler 240 compiles responsive transformations 280 (e.g., a declarative transformation specification) or some other representation of each selected set of candidate responsive transformations using a responsive visualization grammar. In some embodiments, responsive visualization grammar compiler 240 compiles declarative transformation specifications using or more of the following techniques.

Associated elements. Visualization elements can have associations between them, which, in some embodiments, informs how responsive visualization grammar compiler 240 selects and handles the elements. For example, in some cases, axis labels are dependent on the range of visualized data encoded by the x and y positions, and axis labels are associated with the ranges of visualized data values. In some embodiments when a subset of data is omitted under a responsive transformation, responsive visualization grammar compiler 240 omits text annotations attached to the corresponding marks.

Accordingly, in some embodiments, responsive visualization grammar compiler 240 implements one or more of the following principles involving associated elements. First, some implementations of responsive visualization grammar compiler 240 detect associated elements depending on how a user has defined the original design (P1). In the previous example, if the user has declared the text elements directly (without anchoring to certain data points), then responsive visualization grammar compiler 240 interprets them as independent elements that are not subordinate to any other element(s) or data.

Second, some implementations of responsive visualization grammar compiler 240 interpret a transformation impacting the layout of a series of elements, such as adding, removing, or repositioning, as having a downstream impact on the layout of their associated elements (P2), but not the style. In an example implementation, responsive visualization grammar compiler 240 interprets removal of a color encoding channel by discarding the corresponding color legend. In another example, filtering out data points does not impact any independent, non-data annotations, but responsive visualization grammar compiler 240 removes associated text element(s). In yet another example, responsive visualization grammar compiler 240 interprets converting a field from the column to the row of the chart (partial transpose) as moving the axis labels for the field accordingly.

Default behaviors. In some embodiments, responsive visualization grammar compiler 240 applies one or more default behaviors when compiling a declarative transformation. For example, some implementations of responsive visualization grammar compiler 240 modify only what is specified, or externalize at the bottom of the chart, unless specified otherwise. In some scenarios, such as where an author has underspecified a desired behavior (e.g., when adding or internalizing an element such as a text annotation without specifying its position), responsive visualization grammar compiler 240 implements one or more of the following principles involving default behaviors.

First, when adding a new element to a series of elements, some implementations of responsive visualization grammar compiler 240 mimic the appearance of existing elements in the series (P3). In an example implementation, responsive visualization grammar compiler 240 causes newly added axis labels to look similar to the existing axis labels, without further specifying their appearance.

Second, some implementations of responsive visualization grammar compiler 240 set a default appearance for new elements that are not part of an existing series of elements that are in a similar role to be similar to the appearance of the existing series of elements (P4). For example, when adding labels to a y axis that has no existing labels, although they are not in the same series, some implementations of responsive visualization grammar compiler 240 set their appearance to be similar to the labels on the x axis rather than the default presets of the rendering grammar. In some cases, responsive visualization grammar compiler 240 determines the similarity of the role between two series based on whether they can be specified as the same role keyword (e.g., {role: "axis.label"} can specify both {role: "hAxis.label"} and {role: "vAxis.label"} if they both exist).

Third, when there are multiple series of existing elements, some implementations of responsive visualization grammar compiler 240 select the one with the most similar structure (P5). In an example implementation, when adding a new label to an axis that has two groups of existing labels in different styles, responsive visualization grammar compiler 240 determines which of the two groups is most similar to the new label, for example, based on the number of sub-elements (e.g., text segments) and the format of elements.

Fourth, in some embodiments where the position and style of a newly added or repositioned element cannot be fully determined because there is no existing series with a similar role, responsive visualization grammar compiler 240 uses the default options of the rendering grammar's compiler (P6) for newly added elements under the assumption that users are expected to have some basic knowledge about how the rendering grammar behaves. For example, if an example rendering grammar does not automatically generate a legend for a new color scale, an implementation of responsive visualization grammar compiler 240 for this rendering grammar similarly does not introduce a legend when adding a new color encoding. On the other hand, if the example rendering grammar's default is to include a legend, an implementation of responsive visualization grammar compiler 240 for this rendering grammar also adds a legend. In some embodiments where the rendering grammar has no relevant default options, responsive visualization grammar compiler 240 places (new) externalized annotations below the chart, places (new) internalized data annotations (or mark labels) at the center or the bottom of the associated data mark, places (new) internalized non-data annotations at the center of the largest contiguous empty space in the chart, and/or applies other default behaviors.

Conflict management. In some embodiments, responsive visualization grammar compiler 240 generates a declarative transformation specification that represents transformation rules in a list form (e.g., as in transformation rule object 530 of FIG. 5C). In some implementations, responsive visualization grammar compiler 240 generates a declarative transformation specification that (e.g., explicitly) indicates the order of declared transformation rules. However, in some cases, the order of rules impacts how responsive visualization grammar compiler 240 interprets a given specification. As such, in some embodiments, responsive visualization grammar compiler 240 solves conflicts using one or more of the following methods.

First, in some embodiments, a default rule can help responsive visualization grammar compiler 240 choose how to select visualization element(s) in a specifier when other rules in the specification also transform the same element. For example, suppose there is a rule to transpose the x and y positions. This rule also results in swapping the horizontal and vertical axes as they are associated with the x and y position encoding channels. If a user wants to make some design changes in an axis that is the horizontal axis after transposing but is the vertical axis before transposing, a default rule can be beneficial. For example, some implementations of responsive visualization grammar compiler 240 default to always specifying what is in the original view specification or what will appear in the transformed view. In another example, some implementations of responsive visualization grammar compiler 240 apply the current rule to a view that has been transformed by the previous rules (P7), and/or applies the last declared rule (P8) when there are two rules making changes to the same element for the same property. In an example implementation, responsive visualization grammar compiler 240 implements one or more of these principles by updating a target view specification for each transformation rule.

Next, some implementations of responsive visualization grammar compiler 240 assign higher priority to a more specific rule than a more generic rule for the same element (P9). For example, suppose a user wants to change the color of a mark for the "Apparel" category (e.g., more specific rule 610 in FIG. 6) as well as changing the color of all bars (e.g., less specific rule 620 of FIG. 6). In this example, the mark for "Apparel" is impacted by both rules. Therefore, in some embodiments, generic color changes to other bars are not applied to the mark for the "Apparel" category (e.g., some implementations of responsive visualization grammar compiler 240 assign more specific rule 610 a higher priority than less specific rule 620).

In some embodiments, to enhance the degree of freedom in indicating the priority of rules, responsive visualization grammar compiler 240 assigns rules with a configurable importance property set to true a higher priority than other rules (P10). These are just a few examples of potential default rules, and others are contemplated within the scope of the present disclosure.

In some embodiments, responsive visualization grammar compiler 240 includes, provides, or is otherwise associated with an application programming interface (API) with an architecture that handles, compiles, and/or renders a declarative transformation specification using an example class (e.g., the example class named Cicero described herein) and an example load function (e.g., the example function named loadCicero described herein). In an example implementation, a developer using a particular rendering grammar attaches responsive visualization grammar compiler 240 and visualization complier 250 (e.g., the compiler of the rendering grammar that actually draws the visualization) specific to that grammar. In some embodiments, a Cicero class instance contains a source specification in any declarative rendering grammar (e.g., source visualization specification 270), a declarative transformation specification (e.g., representing responsive transformations 280), a transformation compiler (e.g., responsive visualization grammar compiler 240 and/or rendering grammar specification compiler 245) that compiles the source and declarative transformation specification to a target specification, and the compiler function (or equivalent) for the rendering grammar (e.g., visualization compiler 250). In some embodiments, the API provides a load function (e.g., loadCicero) as a wrapper for creating a Cicero class instance, compiling the specifications, and rendering the transformed specification (also called a transformed view). To fit some implementations of the API, some implementations of responsive visualization grammar compiler 240 for a particular rendering grammar take source view and declarative transformation specification and return the transformed specification (not the rendered view), and a renderer (e.g., visualization compiler 250) returns a rendered view given a visualization specification and a DOM element (or selector) to draw the visualization in.

In some embodiments, the Cicero class is instanced with name (e.g., the name of a transformed view or declarative transformation specification), source (e.g., source visualization specification 270), config (e.g., a configuration object such as configuration object 285), and description (e.g., a detailed description for the declarative transformation specification). In some embodiments, after instancing, users can add a list of rule objects using addTransformations method. In some embodiments, users can set a rendering grammar specification compiler and renderer for the rendering grammar using a setCompiler method. In some embodiments, to get the transformed specification in the rendering grammar, users can call a getTransformed method. In some embodiments, to render the transformed view, users can use a getRendered method with a CSS selector for the HTML element (or DOM) to insert the rendered visualization in.

In some embodiments, the loadCicero function makes the above job more pipelined. An example implementation of the loadCicero function takes a declarative transformation specification, source, a rendering grammar specification compiler, and renderer for the rendering grammar. In this example, the loadCicero function returns a Promise object, and a then method of the returning Promise takes a callback function with a Cicero class instance as an argument. This API implementation is meant simply as an example, and other implementations are contemplated within the scope of the present disclosure.

Recommendation Examples. The foregoing discussion provided an example technique that identifies one or more sets of responsive transformations and renders or otherwise generates a representation of one or more corresponding responsive visualizations. In some embodiments, responsive visualization recommender 255 causes a user interface of application 210 to present one or more responsive visualizations as recommendations.

FIGS. 7A-7C illustrate example responsive visualization recommendations (e.g., charts 710-736), in accordance with embodiments of the present invention. In an example embodiment, a recommender (e.g., responsive visualization recommender 255) generates some number of recommendations (e.g., 7) based on a particular input chart. Each of FIGS. 7A, 7B, and 7C illustrates a representative subset of example recommendations (e.g., visualizations that are more distinct from one another). In FIGS. 7A, 7B, and 7C, certain text fields of input charts and corresponding recommendations are represented in simplified form for illustration purposes, (e.g., fields representing a title, subtitle, and data annotations (DA)).

The bond yields example illustrated in FIG. 7A visualizes changes to the actual and forecasted GDP growth rates over time. In FIG. 7A, the input chart is a desktop version in which the x position encodes the year from 2010 to 2021, and the y position indicates the GDP growth rate from 3.0 to 5.5. Area mark 751 and solid line mark 752 represent the actual GDP growth rate from 2010 to 2015. The dotted lines represent the five-year forecast of GDP growth rate for each year from 2010 to 2016; for example, the leftmost dotted line shows the estimated GDP growth rates for 2011 to 2015, as forecast in 2010.

In an example embodiment, to generate candidate mobile views for the Bond Yields case, a configuration object specifies the target size of a mobile view and a subset of data that can be omitted (referring to the original design): {forecasted_year: {leq: 2011}}, {year: {leq: 2011}}. The first recommendation (chart 710) is simply resized to the target size. While this view may look dense, it keeps the most of the information within a single scroll height. In the second recommendation (chart 712), the suggested data omission is applied to remove years less than or equal to 2011. The data annotations (DA) for the forecast years of 2010 and 2016 are shortened by removing the first line of the data annotations DA 1 and DA 3 in the third recommendation (chart 714). The fourth recommendation (chart 716) externalizes the same data annotations DA1-4 below the chart with numbering for reference to the data marks, which may need more vertical scrolling to see the annotations.

The disaster cost example illustrated in FIG. 7B visualizes the losses associated with major natural disasters in the U.S. In FIG. 7B, the input chart is a mobile version in which the x position encodes the year, while bar height represents the loss in USD. Bars for five disasters have labels (their names) in the mobile version. There is a title element (two lines, represented as Title and Subtitle) above the visualization.

Charts 720-724 are desktop view recommendations for the Disaster Cost case, showing interaction features added to desktop views. In all three visualizations, the title is internalized to the visualization, which uses the increased screen space more efficiently. The first recommendation (chart 720) resizes the chart, adding more y axis labels and grid lines, internalizing the title, and lengthening some x axis labels (e.g., lengthening an abbreviated label such as '15, not illustrated in the input chart in FIG. 5B, to 2015 as in chart 720). The second recommended desktop view (chart 722) does add more y axis gridlines, but does not add more y axis labels, and has a tooltip interaction (e.g., tooltip 755) for bar marks, as the increased bar sizes make it easier to hover on them compared to the input chart. The third recommendation (chart 724) adds a context view with a brush-based selection interaction in addition to the transformations applied to the first recommendation (chart 720), utilizing the increased screen space. Adding such a context view could help users to have a closer look at the data while utilizing the larger screen space.

The aid budget example illustrated in FIG. 7C visualizes the COVID-19 aid budget plans for each business sector suggested by the Democratic (black, right) and Republican (white, left) U.S. parties compared to the budgets already passed by the U.S. Congress (gray, middle). This example illustrates more complicated transformations like partial transpose, reordering rows, and a role change from axis labels to legends. In FIG. 7C, the input chart is a desktop version with three columns for the Republican, already passed, and Democratic plans in this order, and rows for eight business sectors, composing a tabulated format. Each bar encodes the budget amount of the corresponding plan and sector categories.

The mobile view recommendations (charts 730-736) for the Aid Budget visualization include different layout transformations given the desktop view. For all the recommendations, both y and x axis labels (i.e., the sector and plan names) are wrapped to allocate more space to graphical elements. In the first recommendation (chart 730), the entire view is transposed, and the axis and mark labels repositioned accordingly. While this provides a decent space to make comparisons between bars along the y position, it increases the visualization height such that the bars do not appear within a single scroll height. The second recommendation (chart 732) is more likely to contain the visual information within a single scroll height by keeping the original layout, yet it reduces the visual resolution for comparison along the x position. While the reordering of the plan field is not reflected, the third recommendation (chart 734) almost reproduces the original mobile view, with partial transpose and replacement of axis labels with a legend. In this view, the plan field is moved from the column to the row of the chart, and its axis labels are replaced with legends for the color channel. The axis labels for the plan field are also converted to the legend. Compared to the source visualization (within-group), the third recommendation can support different types of comparisons (between-group), potentially resulting in different takeaways. The fourth recommendation (chart 736) exhibits bigger transformations, including changes to the mark type from bar to rectangle and encoding changes from the y position to color (which removes the existing redundant color channel for the plan field), resulting in a heatmap. In addition, mark labels are overlaid to the center of the modified marks. While this chart type change may make it harder to compare each pair of data points, it helps with adjusting graphical density by allowing the overlay.

Example Flow Diagrams

Figure 8:
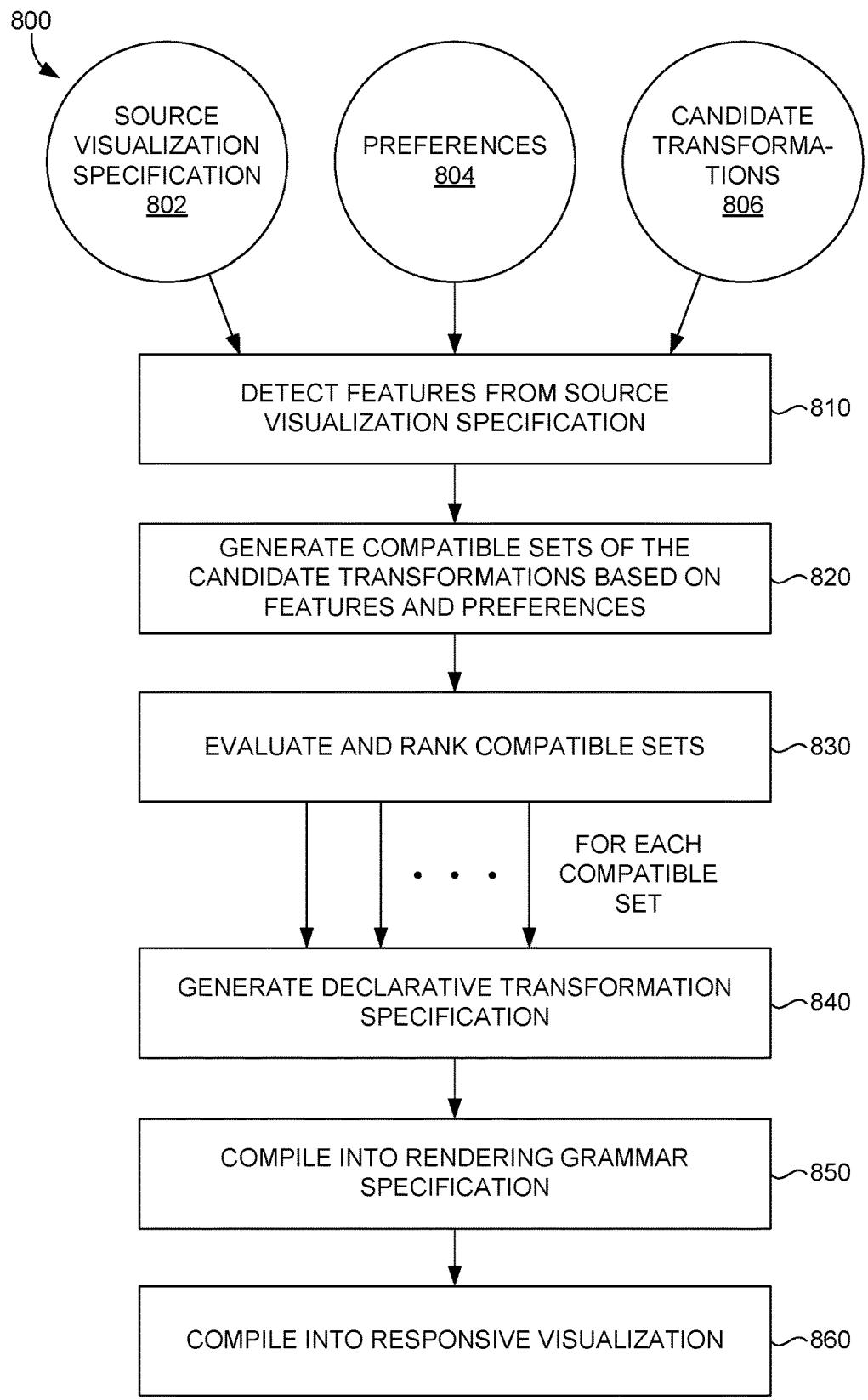
FIG. 8 is a flow diagram showing a method for compiling responsive visualizations, in accordance with embodiments of the present invention.
Figure 9:
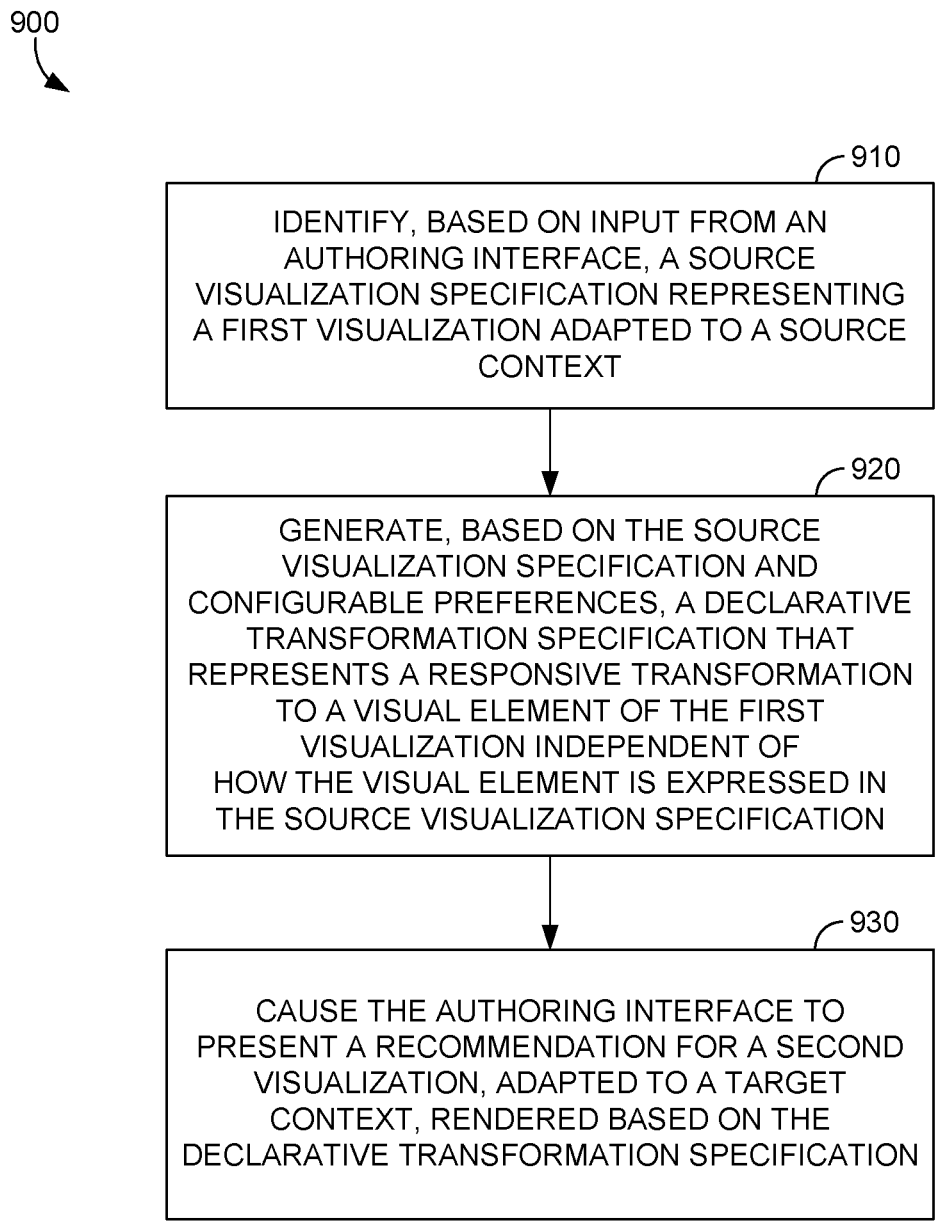
FIG. 9 is a flow diagram showing a method for authoring a responsive visualization, in accordance with embodiments of the present invention.
Figure 10:
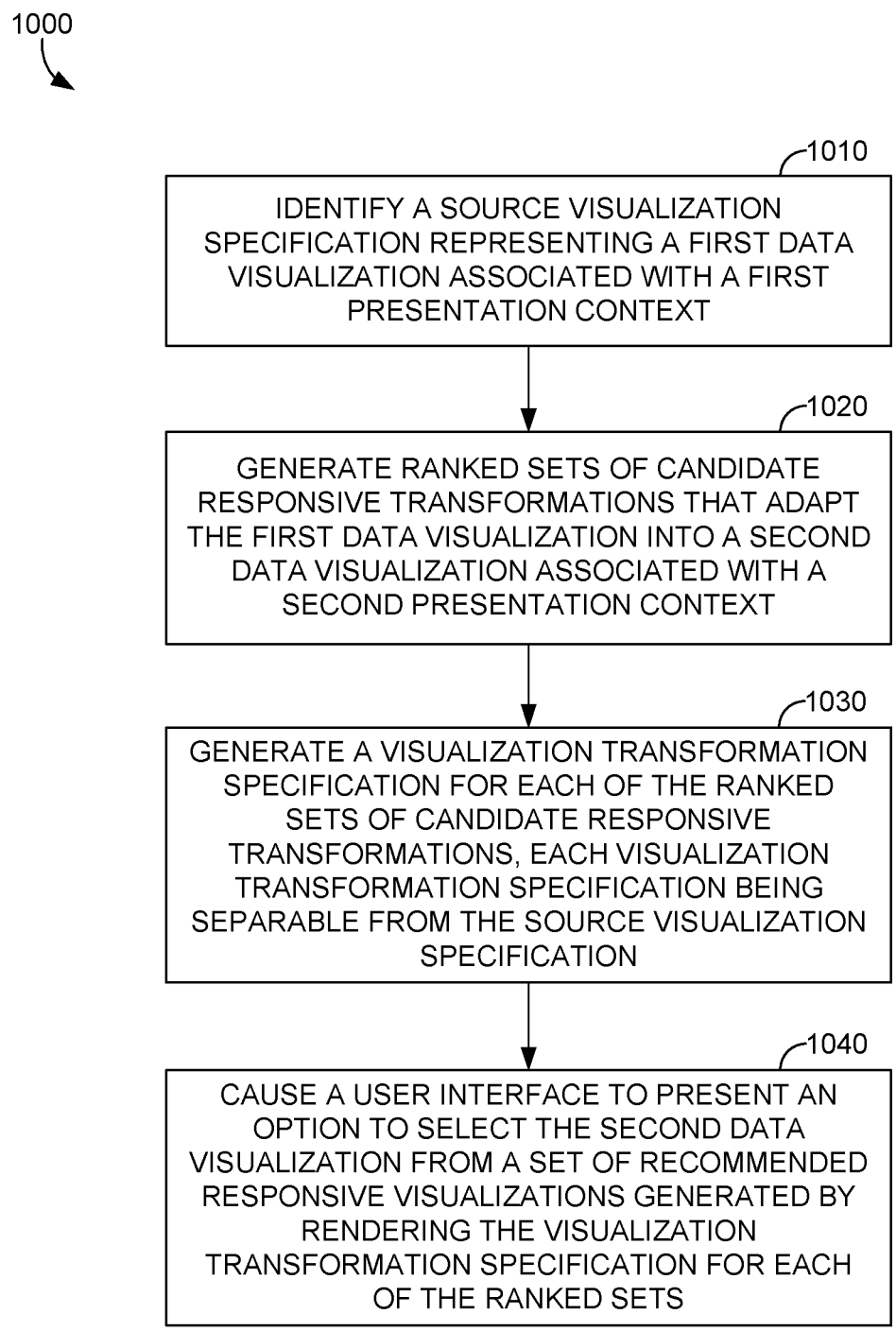
FIG. 10 is a flow diagram showing a method for generating recommended responsive visualizations, in accordance with embodiments of the present invention.

With reference now to FIGS. 8-10, flow diagrams are provided illustrating methods for authoring or generating responsive visualizations. Each block of the methods 800, 900, and 1000 and any other methods described herein comprise a computing process performed using any combination of hardware, firmware, and/or software. For instance, in some embodiments, various functions are carried out by a processor executing instructions stored in memory. In some cases, the methods are embodied as computer-usable instructions stored on computer storage media. In some implementations, the methods are provided by a standalone application, a service or hosted service (standalone or in combination with another hosted service), or a plug-in to another product, to name a few.

Turning initially to FIG. 8, FIG. 8 illustrates a method 800 for compiling responsive visualizations, in accordance with embodiments of the present invention. Initially, source visualization specification 802 (e.g., source visualization specification 270 of FIG. 2), preferences 804 (e.g., responsive design preferences 275), and candidate transformations 806 are inputs to method 800. In an example embodiments, candidate transformations 806 are encoded into a tool such as data visualization authoring tool 215 and/or responsive visualization generator 220 of FIG. 2.

At block 810, features are detected from source visualization specification 802 (e.g., by feature detector 225 of FIG. 2), and at block 820, compatible sets of candidate transformations 806 are generated based on the detected features and preferences 804 (e.g., by candidate responsive transformation generator 230 of FIG. 2). For example, extraction rules and preferences 804 are converted into rules and constraints that detect features from source visualization specification 802 and preferences 804, and answer set programming (ASP) is used to identify compatible sets of candidate transformations 806 such that all rules are satisfied and no constraint is violated. At block 830, each of the compatible sets is evaluated and ranked (e.g., by ranking component 235 of FIG. 2), for example, using the one or more costs such as density cost, message cost, and/or popularity cost.

For each compatible set, at block 840, a declarative transformation specification is generated (e.g., by responsive visualization grammar complier 240 of FIG. 2). At block 850, the declarative transformation specification is compiled into a rendering grammar specification (e.g., by rendering grammar specification compiler 245 of FIG. 2). At block 860, the rendering grammar specification is compiled into a responsive visualization (e.g., by visualization compiler 250 of FIG. 2).

Turning now to FIG. 9, FIG. 9 illustrates a method 900 for authoring a responsive visualization, in accordance with embodiments of the present invention. Initially at block 910, based on input from an authoring interface, a source visualization specification representing a first visualization adapted to a source context is identified. At block 920, based on the source visualization specification and configurable preferences, a declarative transformation specification is generated that represents a responsive transformation to a visual element of the first visualization independent of how the visual element is expressed in the source visualization specification. At block 930, the authoring interface is caused to present a recommendation for a second visualization, adapted to a target context, rendered based on the declarative transformation specification.

Turning now to FIG. 10, FIG. 10 illustrates a method 1000 for generating recommended responsive visualizations, in accordance with embodiments of the present invention. Initially at block 1010, a source visualization specification representing a first data visualization associated with a first presentation context is identified. At block 1020, ranked sets of candidate responsive transformations are generated that adapt the first data visualization into a second data visualization associated with a second presentation context. At block 1030, a visualization transformation specification is generated for each of the ranked sets of candidate responsive transformations, each visualization transformation specification being separable from the source visualization specification. At block 1040, a user interface is caused to present an option to select the second data visualization from a set of recommended responsive visualizations generated by rendering the visualization transformation specification for each of the ranked sets.

Example Operating Environment

Figure 11:
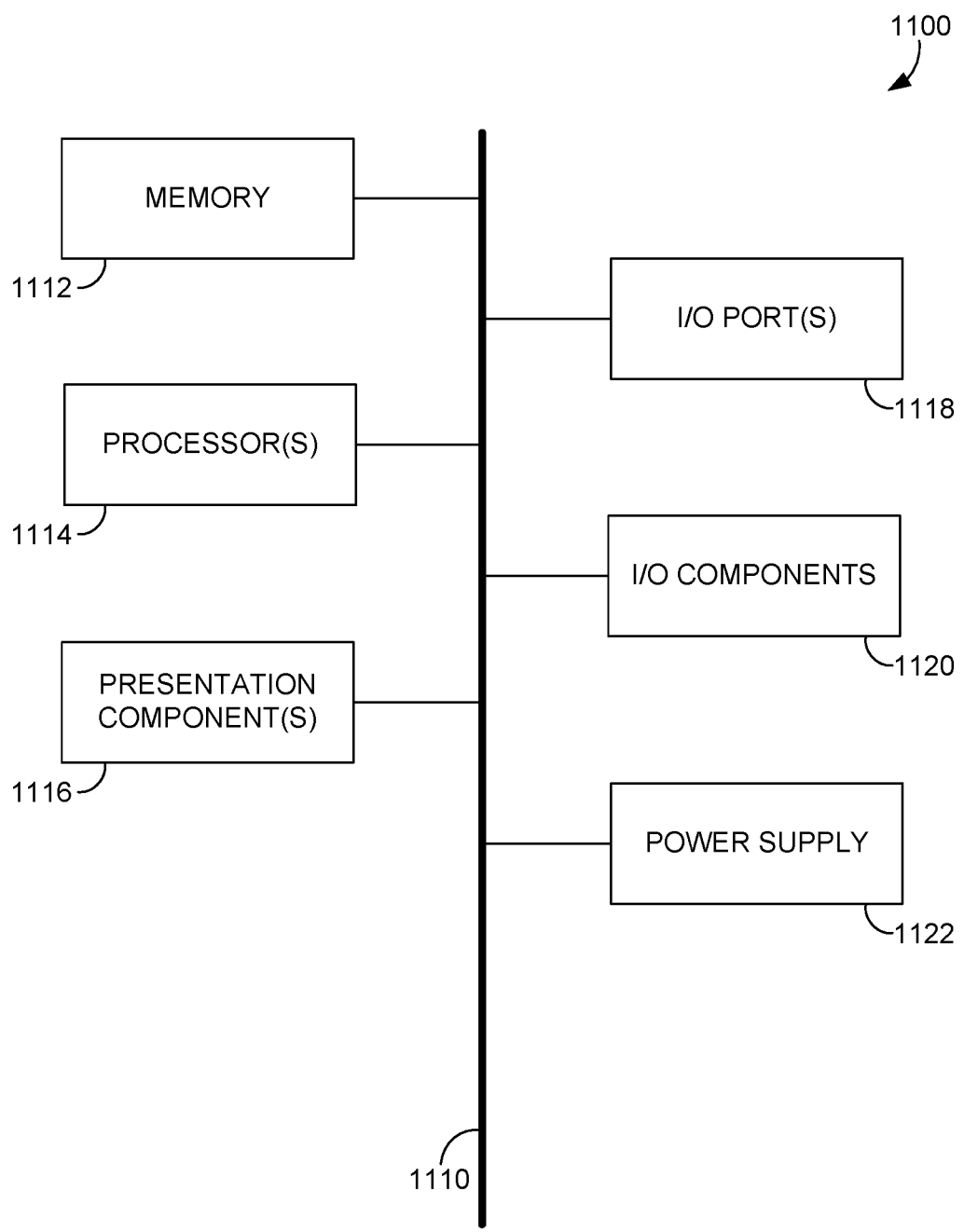
FIG. 11 is a block diagram of an example computing environment suitable for use in implementing embodiments of the present invention.

Having described an overview of embodiments of the present invention, an example operating environment in which some embodiments of the present invention are implemented is described below in order to provide a general context for various aspects of the present invention. Referring now to FIG. 11 in particular, an example operating environment for implementing embodiments of the present invention is shown and designated generally as computing device 1100. Computing device 1100 is but one example of a suitable computing environment and is not intended to suggest any limitation as to the scope of use or functionality of the invention. Neither should computing device 1100 be interpreted as having any dependency or requirement relating to any one or combination of components illustrated.

In some embodiments, the present techniques are embodied in computer code or machine-useable instructions, including computer-executable instructions such as program modules, being executed by a computer or other machine, such as a cellular telephone, personal data assistant or other handheld device. Generally, program modules including routines, programs, objects, components, data structures, etc., refer to code that perform particular tasks or implement particular abstract data types. Various embodiments are practiced in a variety of system configurations, including hand-held devices, consumer electronics, general-purpose computers, more specialty computing devices, etc. Some implementations are practiced in distributed computing environments where tasks are performed by remote-processing devices that are linked through a communications network.

With reference to the example operating environment illustrated in FIG. 11, computing device 1100 includes bus 1110 that directly or indirectly couples the following devices: memory 1112, one or more processors 1114, one or more presentation components 1116, input/output (I/O) ports 1118, input/output components 1120, and illustrative power supply 1122. Bus 1110 represents what may be one or more busses (such as an address bus, data bus, or combination thereof). Although the various blocks of FIG. 11 are shown with lines for the sake of clarity, in some cases, it is not possible to delineate clear boundaries for different components. In this case, metaphorically, the lines would be grey and fuzzy. As such, the diagram of FIG. 11 and other components described herein should be understood as merely illustrative of various example implementations, such as an example computing device implementing an embodiment or a portion thereof. Distinction is not made between such categories as "workstation," "server," "laptop," "hand-held device," etc., as all are contemplated within the scope of FIG. 11 and a "computing device."

Computing device 1100 typically includes a variety of computer-readable media. Computer-readable media can be any available media that can be accessed by computing device 1100 and includes both volatile and nonvolatile media, and removable and non-removable media. By way of nonlimiting example, in some cases, computer-readable media comprises computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1100. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1112 includes computer-storage media in the form of volatile and/or nonvolatile memory. In various embodiments, the memory is removable, non-removable, or a combination thereof. Example hardware devices include solid-state memory, hard drives, optical-disc drives, etc. Computing device 1100 includes one or more processors that read data from various entities such as memory 1112 or I/O components 1120. Presentation component(s) 1116 present data indications to a user or other device. Example presentation components include a display device, speaker, printing component, vibrating component, etc.

I/O ports 1118 allow computing device 1100 to be logically coupled to other devices including I/O components 1120, some of which may be built in. Illustrative components include a microphone, joystick, game pad, satellite dish, scanner, printer, wireless device, etc. The I/O components 1120 may provide a natural user interface (NUI) that processes air gestures, voice, or other physiological inputs generated by a user. In some instances, inputs are transmitted to an appropriate network element for further processing. In some embodiments, an NUI implements any combination of speech recognition, stylus recognition, facial recognition, biometric recognition, gesture recognition both on screen and adjacent to the screen, air gestures, head and eye tracking, and/or touch recognition (as described in more detail below) associated with a display of computing device 1100. In some cases, computing device 1100 is equipped with depth cameras, such as stereoscopic camera systems, infrared camera systems, RGB camera systems, touchscreen technology, and combinations of these, for gesture detection and recognition. Additionally or alternatively, the computing device 1100 is equipped with accelerometers or gyroscopes that enable detection of motion, and in some cases, an output of the accelerometers or gyroscopes is provided to the display of computing device 1100 to render immersive augmented reality or virtual reality.

Embodiments described herein support generation or authoring of responsive visualizations. The components described herein refer to integrated components of a responsive visualization generation or authoring system. The integrated components refer to the hardware architecture and software framework that support functionality using the responsive visualization generation or authoring system. The hardware architecture refers to physical components and interrelationships thereof and the software framework refers to software providing functionality that can be implemented with hardware embodied on a device.

In some embodiments, the end-to-end software-based system operates within the components of the responsive visualization generation or authoring system to operate computer hardware to provide system functionality. At a low level, hardware processors execute instructions selected from a machine language (also referred to as machine code or native) instruction set for a given processor. The processor recognizes the native instructions and performs corresponding low-level functions relating, for example, to logic, control and memory operations. In some cases, low-level software written in machine code provides more complex functionality to higher levels of software. As used herein, computer-executable instructions includes any software, including low-level software written in machine code, higher level software such as application software and any combination thereof. In this regard, system components can manage resources and provide services for the system functionality. Any other variations and combinations thereof are contemplated with embodiments of the present invention.

Having identified various components in the present disclosure, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions, etc.) can be used in addition to or instead of those shown.

The subject matter of the present invention is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described. For purposes of this disclosure, words such as "a" and "an," unless otherwise indicated to the contrary, include the plural as well as the singular. Thus, for example, the requirement of "a feature" is satisfied where one or more features are present.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer storage media storing computer-useable instructions that, when used by one or more computing devices, cause the one or more computing devices to perform operations comprising:
identifying, based on user input from an authoring interface, a source visualization specification representing a first visualization adapted to a source context, the source visualization specification provided in at least one of serializing and parallelizing labels and marks;
generating, based on the source visualization specification and configurable preferences configured by a user, a declarative transformation specification of a target context and a responsive transformation to a visual element of the first visualization to the target context, wherein the responsive transformation is the same when generated from a source visualization specification in serializing labels and marks as when generated from a source visualization specification in parallelizing labels and marks; and
causing the authoring interface to present a recommendation for a second visualization, adapted to the target context, rendered based on the declarative transformation specification.

2. The one or more computer storage media of claim 1, the operations further comprising rendering the second visualization by:
compiling the declarative transformation specification into a rendering grammar specification; and
compiling the rendering grammar specification to render the second visualization.

3. The one or more computer storage media of claim 1, wherein the declarative transformation specification comprises: a configuration object representing the target context, and a list of transformation rules comprising the responsive transformation.

4. The one or more computer storage media of claim 1, wherein the declarative transformation specification represents each transformation rule using a declarative grammar syntax that characterizes a corresponding responsive transformation as a tuple that identifies one or more visual elements and an action to perform on the one or more visual elements.

5. The one or more computer storage media of claim 1, wherein the declarative transformation specification comprises code that queries visual elements represented in the source visualization specification based on a role of the visual elements in the first data visualization.

6. The one or more computer storage media of claim 1, the operations further comprising accepting input updating the configurable preferences to represent a preferred subset of encoded transformations.

7. The one or more computer storage media of claim 1, the operations further comprising:
accessing a plurality of candidate responsive transformations;
identifying compatible sets of the candidate responsive transformations using rules and constraints converted from the source visualization specification; and
ranking the compatible sets of the candidate responsive transformations based on one or more cost metrics;
wherein the declarative transformation specification represents a top ranked set of the compatible sets.

8. A method comprising:
identifying a source visualization specification representing a first data visualization associated with a first presentation context;
generating ranked sets of candidate responsive transformations that specify how to adapt the first data visualization into a second data visualization associated with a second presentation context, the ranked sets of candidate response transformations generated by at least one of:
penalizing transformations that change information density;
penalizing transformations that change how a visualization supports communicating a message; and rewarding transformations based on a measure of popularity;

generating a visualization transformation specification representing the second presentation context and a manner of adapting the first data visualization to the second presentation context for each of the ranked sets of candidate responsive transformations, each visualization transformation specification being separable from the source visualization specification; and causing a user interface to present an option to select the second data visualization from a set of recommended responsive visualizations generated by rendering the visualization transformation specification for each of the ranked sets.

9. The method of claim 8, further comprising rendering the second data visualization by:

compiling the visualization transformation specification into a rendering grammar specification; and compiling the rendering grammar specification to render the second data visualization.

10. The method of claim 8, wherein the visualization transformation specification comprises: a configuration object representing the second presentation context, and a list of transformation rules representing the candidate responsive transformations in each ranked set.

11. The method of claim 8, wherein the visualization transformation specification represents each transformation rule using a declarative grammar syntax that characterizes a corresponding responsive transformation as a tuple that identifies one or more visual elements and an action to perform on the one or more visual elements.

12. The method of claim 8, wherein the visualization transformation specification comprises code that queries visual elements represented in the source visualization specification based on a role of the visual elements in the first data visualization.

13. The method of claim 8, further comprising accepting input specifying a preferred subset of encoded transformations, wherein generating the ranked sets is based on the preferred subset.

14. The method of claim 8, wherein ranking the compatible candidate responsive transformations is based on one or more configurable cost metrics.

15. The method of claim 8, wherein, each of the candidate responsive transformations of the ranked set is a compatible responsive transformation determined from detected features of the source visualization specification.

16. A computer system comprising:

one or more hardware processors and memory configured to provide computer program instructions to the one or more hardware processors; and a data visualization authoring tool configured to use the one or more hardware processors to:

identify a source visualization specification representing a first data visualization associated with a first presentation context;

generate a visualization transformation specification of a set of compatible candidate responsive transformations that specify how to adapt visual elements of the first data visualization to a second presentation context independent of whether the source visualization specification represents the visual elements in one of serializing and parallelizing labels and marks, wherein the compatible candidate responsive transformations are determined from detected features of the source visualization specification and ranked based on one or more cost metrics that quantify changes in information density, how a visualization communicates information, or popularity of a transformation; and generate, based on the visualization transformation specification, a representation of a second data visualization associated with the second presentation context.

17. The computer system of claim 16, wherein the data visualization authoring tool is further configured to generate the representation of the second data visualization by:

compiling the visualization transformation specification into a rendering grammar specification; and compiling the rendering grammar specification to render the second data visualization.

18. The computer system of claim 16, wherein the data visualization authoring tool is further configured to update a project file to include a visualization specification or image of the second data visualization.

* * * * *